US012254766B2

(12) United States Patent
Takasaki et al.

(10) Patent No.: US 12,254,766 B2
(45) Date of Patent: Mar. 18, 2025

(54) CALCULATING TRAFFIC FLOW CHANGES DUE TO TRAFFIC EVENTS

(71) Applicant: International Business Machines Corporation, Armonk, NY (US)

(72) Inventors: Kenichi Takasaki, Tokyo (JP); Shoichiro Watanabe, Tokyo (JP); Sanehiro Furuichi, Tokyo (JP); Yasutaka Nishimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 17/198,893

(22) Filed: Mar. 11, 2021

(65) Prior Publication Data

US 2022/0292955 A1 Sep. 15, 2022

(51) Int. Cl.
*G08G 1/133* (2006.01)
*G08G 1/01* (2006.01)

(52) U.S. Cl.
CPC .................................. *G08G 1/0133* (2013.01)

(58) Field of Classification Search
CPC .... G08G 1/0133; G08G 1/0145; G08G 1/065; G08G 1/0104; G08G 1/096775; G08G 1/00; G08G 1/09; G08G 1/0962; G08G 1/0967; G08G 1/096766; G08G 1/0141; G08G 1/096741; G08G 1/096811; G08G 1/0129; G08G 1/0137; G08G 1/052;
(Continued)

(56) References Cited

U.S. PATENT DOCUMENTS 9,625,266 B1 * 4/2017 Chintakindi ....... G01C 21/3484
9,959,756 B2 5/2018 Filley et al.
(Continued)

FOREIGN PATENT DOCUMENTS

CN 102419905 B 7/2013
CN 103839411 B 3/2016
JP 2010033331 A 2/2010

OTHER PUBLICATIONS

Abadi, et al., "Traffic Flow Prediction for Road Transportation Networks With Limited Traffic Data," https://ieeexplore.ieee.org/document/6878453, IEEE Transactions on Intelligent Transportation Systems, vol. 16, No. 2, Apr. 2015, 10 ogs.
(Continued)

*Primary Examiner* — James J Yang
*Assistant Examiner* — Anthony D Afrifa-Kyei
(74) *Attorney, Agent, or Firm* — James L. Olsen

(57) ABSTRACT

A method for calculating traffic flow changes includes detecting a traffic event. The method further includes determining an affected area of the traffic event and determining an investigation area based on the affected area. The method further includes selecting at least one vehicle located within the investigation area and calculating a change in traffic flow due to the traffic event based on a comparison of a predicted traffic flow with a current traffic flow, wherein the current traffic flow is based on information received from the at least one vehicle. The method further includes updating the affected area based on the change in traffic flow and calculating an updated change in traffic flow based on the updated affected area when the updated affected area is larger than a predetermined threshold area.

25 Claims, 9 Drawing Sheets

(58) Field of Classification Search
CPC ............ G06N 5/04; G06N 5/00; G06N 5/041; G06N 5/042; G06N 5/043; G06N 5/045; G06N 5/046; G06N 5/048; G06N 20/00; G06N 3/0445; G06N 3/0454; G01C 21/3492; G01C 21/3691; G01C 21/3415; G01C 21/00; G01C 19/00; G01C 21/26; G01C 21/34; G01C 21/3407; G01C 21/3694; G06Q 10/0639; G06Q 10/00; G06Q 10/06; G06Q 10/063; G06Q 10/06395; G06Q 10/06398; H04W 8/183; H04W 8/205
See application file for complete search history.

(56) References Cited

U.S. PATENT DOCUMENTS

| | | | | |
|---|---|---|---|---|
| 2012/0054145 | A1* | 3/2012 | Suzuki | G06N 5/04 706/52 |
| 2014/0114556 | A1* | 4/2014 | Pan | G08G 1/0129 701/119 |
| 2015/0161886 | A1* | 6/2015 | Kesting | G08G 1/01 701/117 |
| 2015/0221218 | A1 | 8/2015 | Downs et al. | |
| 2017/0098372 | A1* | 4/2017 | Eilertsen | G08G 1/0133 |
| 2018/0063002 | A1* | 3/2018 | Filley | H04L 47/127 |
| 2021/0212168 | A1* | 7/2021 | Yoden | H04W 88/06 |

OTHER PUBLICATIONS

Asakura et al., "Incident Detection Methods Using Probe Vehicles with On-board GPS Equipment," https://www.researchgate.net/publication/275528334_Incident_Detection_Methods_Using_Probe_Vehicles_with_On-board_GPS_Equipment, Transportation Research Procedia 6 (2015) pp. 17-27.

Ito et al., "Predicting traffic congestion using driver behavior," sciencedirect.com/science/article/pii/S1877050917314345, Procedia Computer Science 112 (2017) 1288-1297.

Li et al., "Overview of traffic incident duration analysis and prediction," https://doi.org/10.1186/s12544-018-0300-1, European Transport Research Review (2018) 10:22, 13 pgs.

Li et al., "Traffic Accident Propagation Properties and Control Measures for Urban Links Based on Cellular Automata," Advances in Mechanical Engineering, vol. 2013, Article ID 905640, http://dx.doi.org/10.1155/2013/905640, Hindawi Publishing Corporation, 8 pgs.

Mell et al., "The NIST Definition of Cloud Computing," Recommendations of the National Institute of Standards and Technology, U.S. Department of Commerce, Special Publication 800-145, Sep. 2011, 7 pgs.

Sunderrajan et al., "Traffic State Estimation Using Floating Car Data," https://www.researchgate.net/publication/303745944_Traffic_State_Estimation_Using_Floating_Car_Data, Procedia Computer Science, Dec. 2016, DOI: 10.1016/j.procs.2016/05.521, 12 pgs.

* cited by examiner

CALCULATING TRAFFIC FLOW CHANGES DUE TO TRAFFIC EVENTS

BACKGROUND

The present disclosure relates to computer assisted driving, and more specifically, to calculation of traffic flow changes for one or more traffic events in semi-real time.

In advanced drive support systems for computer assisted driving, predictions of future velocities of vehicles traveling on roads can be generated by applying machine learning techniques to velocity data. These techniques can be used, for example, to predict driving routes for vehicles. However, conventional techniques struggle to account for accidents, traffic jams, or other traffic events which affect the velocities and paths of vehicles. Events which affect the velocities and paths of vehicles are generically referred to herein as "traffic events." Sometimes, in the case of multiple traffic events, each of a plurality of traffic events can affect one or more other traffic events creating a more complicated plurality of traffic events. These traffic events can have an influence that is propagated on the traffic volume and/or flow of nearby roads. Most conventional techniques lack the ability to account for these impacts.

Some existing traffic jam simulators are capable of implementing an algorithm that calculates how a traffic jam propagates as time elapses after the traffic jam has occurred. However, these simulators rely on calculations that involve simulations using traffic volumes at each road, at each time, which presents a drawback in terms of computation cost; in obtaining all the information and in calculating the propagation with the simulation algorithm. This drawback is magnified when more than one traffic event occurs, particularly when the traffic events have overlapping areas of effect.

SUMMARY

Disclosed herein are embodiments of a method, system, and computer program product for calculating traffic flow changes due to traffic events.

In accordance with at least one embodiment of the present disclosure, a method for calculating traffic flow changes includes detecting a traffic event, determining an affected area of the traffic event, and determining an investigation area based on the affected area. The method further includes selecting at least one vehicle located within the investigation area and calculating a change in traffic flow due to the traffic event based on a comparison of a predicted traffic flow with a current traffic flow, wherein the current traffic flow is based on information received from the at least one vehicle. The method further includes updating the affected area based on the change in traffic flow and calculating an updated change in traffic flow based on the updated affected area when the updated affected area is larger than a predetermined threshold area.

By selecting at least one vehicle located within the investigation area, rather than every vehicle located within the investigation area, it is possible to calculate a change in traffic flow more efficiently by requiring less data. Additionally, by updating the affected area based on the change in traffic flow and calculating an updated change in traffic flow based on the updated affected area when the updated affected area is larger than a predetermined threshold area, embodiments of the present disclosure may enable improvements in real-time or semi-real-time adjustments to traffic maps for use by navigation services and/or traffic simulators.

In some embodiments, updating the affected area further includes predicting a propagation of the traffic event. Such embodiments may further enable more accurate estimations of the real-time or semi-real-time impacts of traffic events on roads and/or road segments that may not initially be recognized as being impacted.

In some embodiments, detecting the traffic event further includes detecting a plurality of concurrent traffic events. Such embodiments may further enable more accurate estimations of the real-time or semi-real-time impacts of traffic events that may not initially be recognized as being interrelated.

In accordance with at least one embodiment of the present disclosure, a method for calculating traffic flow changes includes detecting a first traffic event and a second traffic event, wherein the first traffic event and the second traffic event occur contemporaneously, calculating a first affected area of the first traffic event and a second affected area of the second traffic event. The method further includes determining an area of overlap where the first affected area overlaps with the second affected area. The method further includes comparing the area of overlap with a threshold area. The method further includes, when the area of overlap is greater than the threshold area, determining a combined affected area based on the first affected area and the second affected area.

By determining a combined affected area when the area of overlap is greater than the threshold area, embodiments of the present disclosure may enable improvements in real-time or semi-real-time adjustments to traffic maps for use by navigation services and/or traffic simulators by facilitating identification of concurrent traffic events that may have interrelated effects.

In some embodiments, the threshold area is any amount greater than zero. Such embodiments may further improve the sensitivity of identifying concurrent traffic events that may have interrelated effects.

In some embodiments, the first affected area has a first shape and the combined affected area has a second shape that is different than the first shape. Such embodiments may further improve the ability to fine tune the calculation of traffic flow changes to a specific area based on particular aspects of the traffic events.

In accordance with at least one embodiment of the present disclosure, a system for calculating traffic flow changes includes one or more processors and a memory communicatively coupled to the one or more processors. The memory comprises instructions which, when executed by the one or more processors, cause the one or more processors to perform a method. The method includes detecting a first traffic event and a second traffic event, wherein the first traffic event and the second traffic event occur contemporaneously. The method further includes determining a combined affected area of the first traffic event and the second traffic event and determining an investigation area based on the combined affected area. The method further includes selecting at least one vehicle located within the investigation area and calculating a change in traffic flow due to the first and second traffic events based on a comparison of a predicted traffic flow and a current traffic flow, wherein the current traffic flow is based on information received from the at least one vehicle. The method further includes updating the combined affected area based on the change in traffic flow and calculating an updated change in traffic flow based on the updated combined affected area when the updated combined affected area is larger than a predetermined threshold area.

By detecting multiple traffic events that occur contemporaneously and determining a combined affected area of those traffic events, embodiments of the present disclosure may enable improvements in real-time or semi-real-time adjustments to traffic maps for use by navigation services and/or traffic simulators by identifying the combined effects of contemporaneous traffic events. Additionally, by updating the affected area based on the change in traffic flow and calculating an updated change in traffic flow based on the updated affected area when the updated affected area is larger than a predetermined threshold area, embodiments of the present disclosure may enable improvements in real-time or semi-real-time adjustments to traffic maps for use by navigation services and/or traffic simulators.

In accordance with at least one embodiment of the present disclosure, a system for calculating traffic flow changes including one or more processors and a memory communicatively coupled to the one or more processors. The memory comprises instructions which, when executed by the one or more processors, cause the one or more processors to perform a method. The method includes detecting a first traffic event and a second traffic event, wherein the first traffic event and the second traffic event occur contemporaneously. The method further includes calculating a first affected area of the first traffic event and a second affected area of the second traffic event and determining an area of overlap where the first affected area overlaps with the second affected area. The method further includes comparing the area of overlap with a threshold area and, when the area of overlap is greater than the threshold area, determining a combined affected area based on the first affected area and the second affected area.

By detecting multiple traffic events that occur contemporaneously and determining a combined affected area of those traffic events, embodiments of the present disclosure may enable improvements in real-time or semi-real-time adjustments to traffic maps for use by navigation services and/or traffic simulators by identifying the combined effects of contemporaneous traffic events. Additionally, by determining a combined affected area when the area of overlap is greater than the threshold area, embodiments of the present disclosure may enable improvements in real-time or semi-real-time adjustments to traffic maps for use by navigation services and/or traffic simulators by facilitating identification of concurrent traffic events that may have interrelated effects. Additionally, by updating the affected area based on the change in traffic flow and calculating an updated change in traffic flow based on the updated affected area when the updated affected area is larger than a predetermined threshold area, embodiments of the present disclosure may enable improvements in real-time or semi-real-time adjustments to traffic maps for use by navigation services and/or traffic simulators.

In accordance with at least one embodiment of the present disclosure, a computer program product for calculating traffic flow changes includes a computer readable storage medium having program instructions embodied therewith. The program instructions are executable by a computer to perform a method. The method includes detecting a first traffic event and a second traffic event, wherein the first traffic event and the second traffic event occur contemporaneously. The method further includes determining a combined affected area of the first traffic event and the second traffic event and determining an investigation area based on the combined affected area. The method further includes selecting at least one vehicle located within the investigation area and calculating a change in traffic flow due to the first and second traffic events based on a comparison of a predicted traffic flow and a current traffic flow, wherein the current traffic flow is based on information received from the at least one vehicle. The method further includes updating the combined affected area based on the change in traffic flow and calculating an updated change in traffic flow based on the updated combined affected area when the updated combined affected area is larger than a predetermined threshold area.

By detecting multiple traffic events that occur contemporaneously and determining a combined affected area of those traffic events, embodiments of the present disclosure may enable improvements in real-time or semi-real-time adjustments to traffic maps for use by navigation services and/or traffic simulators by identifying the combined effects of contemporaneous traffic events. Additionally, by determining a combined affected area when the area of overlap is greater than the threshold area, embodiments of the present disclosure may enable improvements in real-time or semi-real-time adjustments to traffic maps for use by navigation services and/or traffic simulators by facilitating identification of concurrent traffic events that may have interrelated effects. Additionally, by updating the affected area based on the change in traffic flow and calculating an updated change in traffic flow based on the updated affected area when the updated affected area is larger than a predetermined threshold area, embodiments of the present disclosure may enable improvements in real-time or semi-real-time adjustments to traffic maps for use by navigation services and/or traffic simulators.

According to various embodiments described herein, a system may be provided comprising a processor for implementing the above-described method operations. Furthermore, various embodiments may take the form of a related computer program product, accessible from a computer-usable or computer-readable medium providing program code for use, by, or in connection, with a computer or any instruction execution system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
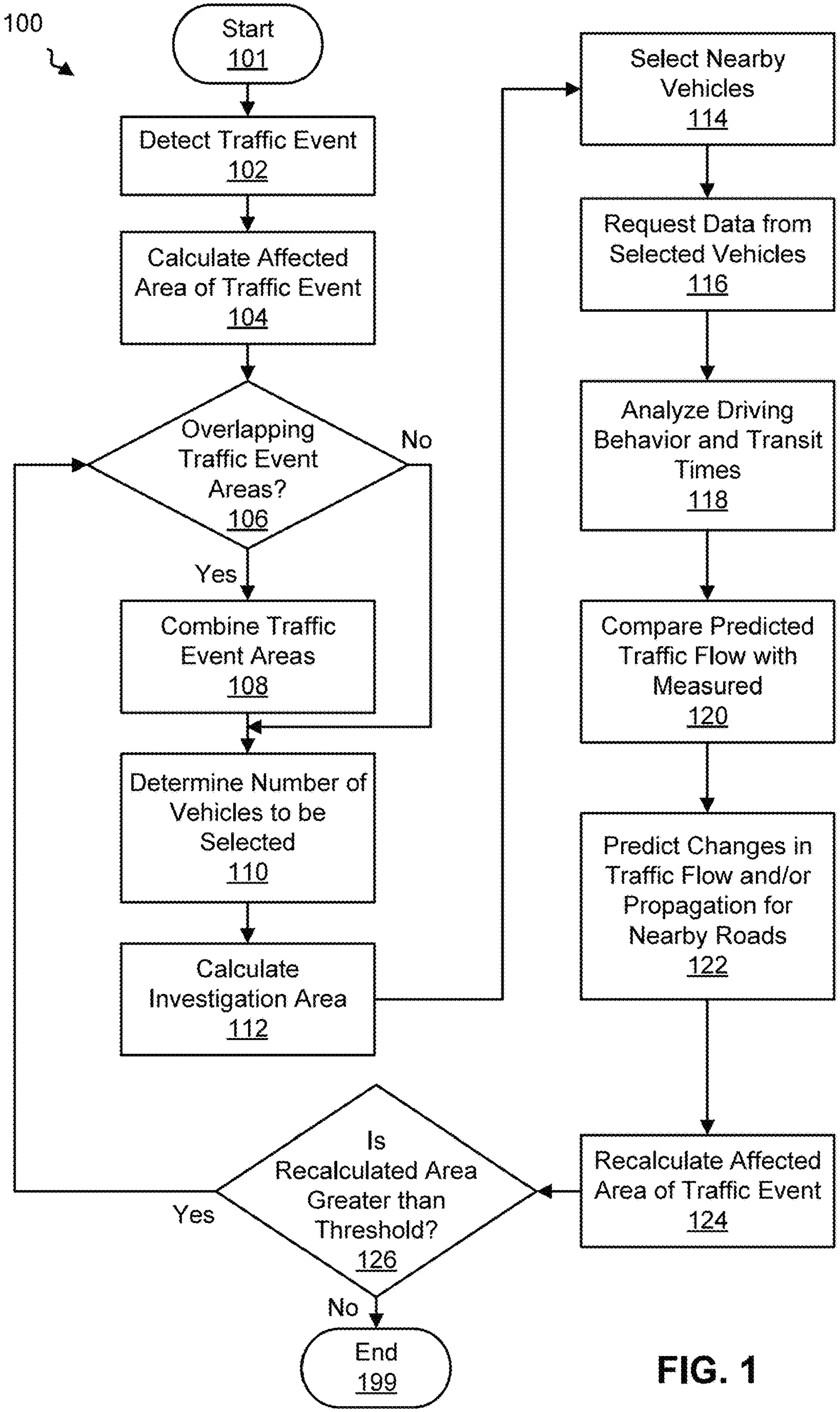
FIG. 1 depicts a flowchart of an example method for calculation of traffic flow changes for one or more traffic events, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer assisted driving, and more particular aspects relate to calculation of traffic flow changes for one or more traffic events in semi-real time. While the present disclosure is not necessarily limited to such applications, various aspects of the disclosure may be appreciated through a discussion of various examples using this context.

Presented herein is a method, system, and computer program product for calculating traffic flow changes for one or more traffic events. Calculating traffic flow changes for traffic events, as described herein, includes identifying vehicles that are predicted to pass through roads or portions of roads that are near the traffic event when the traffic event is occurring by utilizing a driving route prediction technique. More specifically, the traffic flow of some roads or portions of roads that are near the traffic event are predicted to be affected by the traffic event. Such roads or portions of roads make up an area of investigation, also referred to as an investigation area.

In accordance with embodiments of the present disclosure, vehicles that are predicted to pass through the investigation area are identified, and the driving behaviors and transit times of those identified vehicles are calculated. More specifically, a driving route prediction technique is used to identify vehicles that are predicted to pass through the investigation area. Once those vehicles have been identified, deviations in the driving behaviors and/or transit times of those vehicles relative to baseline driving behaviors and/or transit times (e.g., driving behaviors in the absence of a traffic event) are calculated to determine a change in the real-time traffic flow.

In accordance with at least some embodiments of the present disclosure, the investigation area can be updated to account for the change in real-time traffic volume. In such embodiments the identification of vehicles is also updated, including identifying one or more additional vehicles. Updating the investigation area and updating the identification of vehicles in the updated investigation area can lead to a loop wherein vehicles are identified, driving behaviors and transit times are calculated, driving behaviors and transit times are compared to baseline driving behaviors and/or transit times to determine a change in the real-time traffic flow, and the investigation area is updated to account for the change in real-time traffic flow. Once the investigation area no longer changes, or changes less than a threshold amount, simulation algorithms can be used with these calculations to determine the influence of the real-time event on the traffic flow.

A method, system, and computer program product for calculation of traffic flow changes for one or more traffic events as described herein can provide advantages over existing techniques. The teachings of the present disclosure can perform route discovery taking into account traffic events which cannot be predicted with machine learning data due to the complexity of a plurality of traffic events with overlapping areas of effect. Accordingly, embodiments disclosed herein include methods, systems, and computer program products for providing real-time navigation services that consider traffic events to a user. Furthermore, existing techniques fail for traffic events which have not occurred, or have not occurred repeatedly, in the past and therefore are not represented in data used by machine learning techniques. The present disclosure does not require such past data and thus avoids this pitfall of existing techniques. Additionally, because the present disclosure utilizes data transmitted from vehicles in real-time, its predictions of traffic volumes can be more accurate than those relying on past data which may no longer be representative of current conditions. This may be particularly beneficial in embodiments of the present disclosure that provide real-time navigation and route planning to users based on predicted delays caused by traffic events.

These improvements and/or advantages are a non-exhaustive list of example advantages. Embodiments of the present disclosure exist which can contain none, some, or all of the aforementioned advantages and/or improvements.

Referring now to FIG. 1, depicted is a flowchart of an example method 100 for calculating traffic flow changes for one or more traffic events, in accordance with embodiments of the present disclosure. The following discussion refers to the method 100 as being performed by a traffic prediction system. It is to be understood that the traffic prediction system can be implemented by (and, thus, the method 100 can be performed by) a computer, a collection of computers, one or more virtual machines (including running on a cloud platform), a component of a computer, firmware or other software running on a computer, or a computer program product. In some embodiments, the traffic prediction system can be consistent with computer system 700 of FIG. 7 and/or the cloud computing environment 50 of FIGS. 8-9. The method 100 can include more or fewer operations than those depicted. The method 100 can include operations in different orders than those depicted, including operations occurring simultaneously.

From start 101, the method 100 proceeds to operation 102 wherein the traffic prediction system detects a traffic event. For illustrative purposes, and by way of nonlimiting example, the method 100 can be described in the context of a map 200 shown in FIG. 2A. The map 200 includes a number of roads 212*a*, 212*b*, 212*c*, 212*d*, and 212*e* (any combination of which may be collectively referred to as "roads 212"). Detecting a traffic event includes identifying a geographical point of occurrence where the traffic event occurs in the context of the map. For example, performance of operation 102 detects a traffic event at geographical point of occurrence 204 on the map 200 shown in FIG. 2A.

The traffic prediction system can detect a traffic event through various means. For example, a traffic event can be detected when a vehicle involved in a traffic event sends a signal to the traffic prediction system, which may occur if the vehicle is connected to the traffic prediction system by, for example, an IoT network. In some embodiments, the traffic prediction system can monitor other sources for traffic events, including news, law enforcement, emergency services, or other traffic monitoring entities. In some embodiments, the traffic prediction system can utilize camera and/or satellite technologies to visually recognize that a traffic event is occurring. In some embodiments, the traffic prediction system can continuously or periodically receive data from vehicles including location information, trajectory information, acceleration/deceleration information, or other types of information. In such embodiments, the traffic prediction system can use this received information in determining whether a traffic event is occurring. This continuous or periodic receipt of data from vehicles can be generated by vehicles and/or other sources connected using IoT (internet of things) technology.

At operation 104, the traffic prediction system calculates an affected area of the detected traffic event. More specifically, calculating the affected area includes identifying a geographical area, including roads and/or portions of roads near the traffic event, surrounding the geographical point of occurrence. At least one of a number of factors related to the traffic event such as, for example, an event type and an event severity, is considered in the calculation of the affected area. In accordance with at least some embodiments of the present disclosure, calculating the affected area of the traffic event includes combining effects of one or more factors such as event type and severity.

In the context of the map 200, the traffic prediction system calculates an affected area 208 surrounding the geographical point of occurrence 204. The affected area 208 includes portions of a roads 212*a*, 212*b*, and 212*d*, (any combination of which may be collectively referred to as "roads 212").

For embodiments wherein calculating the affected area includes considering an effect of an event type, the traffic prediction system assigns an event type to a traffic event. Example event types include an accident, a traffic jam, a lane closure (e.g., due to road construction or an obstruction on a road), a wild animal crossing, or another type of event the traffic prediction system is configured to detect. In some embodiments, an event that does not fall under one or more identified event types can be referred to as a miscellaneous event.

For embodiments wherein calculating the affected area includes considering an effect of an event severity, the traffic prediction system assigns a severity level to a traffic event. In some embodiments, the severity level can depend in part on the event type. For example, in such embodiments, an accident may be assigned a higher severity level than a lane closure, and a lane closure may be assigned a higher severity level than a traffic jam. In some embodiments, the severity level can depend on the number of vehicles involved in the traffic event. For example, in such embodiments, a multi-vehicle pile-up involving five vehicles can be assigned a higher severity level than a two-car collision. In some embodiments, the severity level can be affected by an expected duration of the traffic event. For example, in such embodiments, a traffic accident which is expected to be cleared from a road within 20 minutes can be assigned a lower severity level than a traffic slowdown due to a sporting event or other large event, which is expected to last one or more hours.

In accordance with some embodiments of the present disclosure, one or more of the factors considered in the calculation of the affected area can be represented by user inputted values. For example, if an operator viewing the traffic event determines that the severity level of a traffic accident is greater than that of a normal traffic accident due to a roll-over of one or more of the vehicles, the operator can input a value that is commensurate with the increased severity level of the traffic event.

The affected area of a traffic event may include only the road experiencing the traffic event or may also include nearby roads. For example, the affected area of some traffic events may include nearby roads which lead toward the same or similar destination and/or alternative, connecting routes including roads which vehicles may take to avoid traffic events.

As noted above, calculating the affected area of the detected traffic event includes consideration of at least one of a number of factors related to the traffic event. More specifically, the boundaries of the geographical area of the affected area are determined by one or more of the factors related to the traffic event.

Figure 2A:
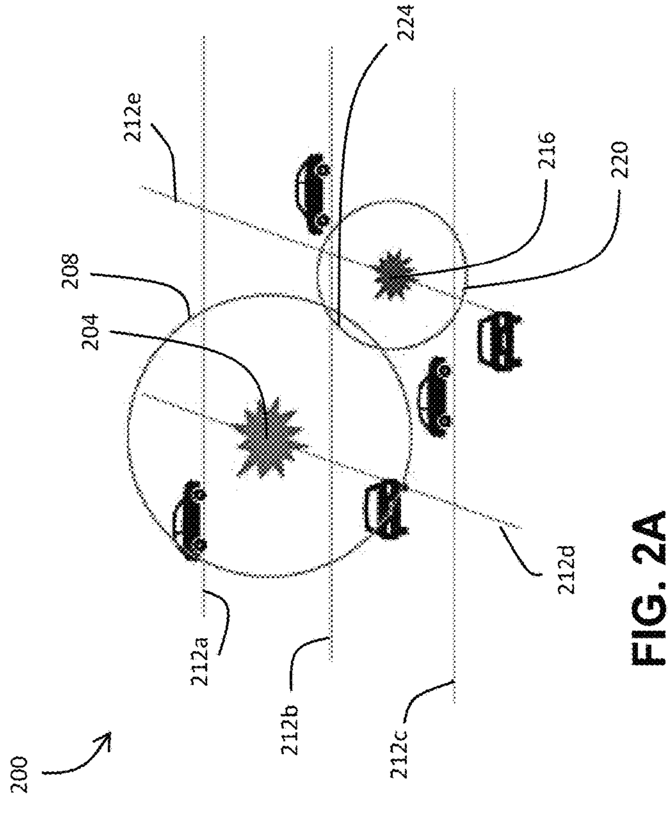
FIG. 2A depicts one of a series of views of multiple traffic events and surrounding areas as used to illustrate the performance of a method for calculation of traffic flow changes for multiple traffic events, in accordance with embodiments of the present disclosure.

In accordance with at least some embodiments of the present disclosure, as shown in FIG. 2A, for example, the affected area 208 can be a circular area, which is centered on the geographical point of occurrence 204 of the traffic event and extends as far as a radius from the geographical point of occurrence 204. In such embodiments, the length of the radius is determined by one or more of the factors related to the traffic event. In some alternative embodiments, the affected area 208 may have a different and/or irregular shape that is not circular. In such embodiments, the boundaries of the affected area are still determined by one or more of factors related to the traffic event.

In some embodiments, calculating an affected area of a traffic event can involve utilizing an IoT network. For example, traffic events can be registered as a context map for road segments (e.g., as a dynamic attribute) or as a point of interest. In such embodiments, when a new traffic event occurs, the traffic prediction system can search road segments in an affected area, such as by using a statically or dynamically determined area. This feature can be further used by the traffic prediction system in the combination of multiple affected areas of traffic events, depending on whether other traffic events are present on the road segments, and add a new dynamic attribute to the affected road segment.

Once the affected area of the detected traffic event has been calculated, the method 100 proceeds to operation 106, wherein the traffic prediction system determines whether there are traffic events having overlapping affected areas. More specifically, the traffic prediction system can perform operations 102 and 104 for multiple traffic events as they occur in real-time, which can be either simultaneously or sequentially. Then, at operation 106, the traffic prediction system determines whether there are multiple concurrent traffic events and, if so, compares the affected area of each of the concurrent traffic events to determine whether there is an area of overlap where the affected areas are coincident. In some embodiments, the traffic prediction system only determines that an area of overlap exists if the coincidence of the affected areas of concurrent traffic events is greater than a threshold value.

For example, if a first traffic event area and a second traffic event area overlap by more than the threshold, the traffic prediction system may combine them into a single, combined traffic event area (referred to herein as the combined affected area). The threshold may be set such that two (or more) traffic event areas are combined if there is any overlap at all or if the overlap exceeds a certain amount (e.g., a certain amount of area, percentage of the total areas, a certain number of road segments, a certain distance of road segment, such as 100 ft of road, etc.). In some embodiments, the threshold may be set such that two traffic event areas are combined even when there is no overlap, provided that the edges of the traffic event areas (or some other feature of the traffic event areas) come close to each other (e.g., are separated by a distance less than the threshold).

In the context of the illustrative map 200, the traffic prediction system detects the traffic event occurring at the geographical point of occurrence 204 and detects another traffic event occurring contemporaneously at the geographical point of occurrence 216 such that the traffic events are concurrent. Additionally, the traffic system calculates the affected area 208 of the traffic event occurring at the geographical point of occurrence 204 and also calculates the affected area 220 of the concurrent traffic event occurring at the geographical point of occurrence 216. Therefore, at operation 106, the traffic prediction system determines that there are multiple concurrent traffic events and compares the affected areas 208 and 220 of the concurrent traffic events. As shown in FIG. 2A, the affected areas 208 and 220 do overlap at an overlapping portion 224.

As used herein, the term "contemporaneous" describes events that occur or exist in the same period of time, though not necessarily beginning and/or ending at precisely the same time. For example, contemporaneous traffic events may begin at different times, but have effects that exist at the same time. For instance, a first traffic event could begin at 9:54 am and a second traffic event could begin at 10:30 am. Such traffic events are contemporaneous if the effects of the first and second traffic events exist at the same time. However, such traffic events are not contemporaneous if the effects of the first traffic event no longer exist by the time the second traffic event begins. In other words, events may be contemporaneous if the times, from beginning to end, of the effects of the events overlap with one another.

Similarly, as used herein, the term "concurrent" describes events existing or happening at the same time, though not necessarily beginning and/or ending at precisely the same time. For example, concurrent traffic events may begin at different times, but have effects that exist at the same time. In other words, events may be concurrent if the times, from beginning to end, of the effects of the events overlap with one another. Accordingly, the term contemporaneous and the term concurrent may be used interchangeably herein.

In accordance with some embodiments of the present disclosure, the traffic prediction system is configured to monitor only single traffic events. In such embodiments, the performance of operation 106 is optional. Alternatively, the method 100 can instead proceed from operation 104 to operation 110, which is discussed in further detail below.

If, at operation 106, it is determined that there are concurrent traffic events having overlapping affected areas ("Yes"), then the method 100 proceeds to operation 108, wherein the affected areas of the concurrent traffic events are combined. When the affected areas for multiple concurrent traffic events are combined, they can be treated thereafter as a single, larger affected area. Accordingly, the concurrent traffic events can also be treated thereafter as a single, larger traffic event. In some embodiments, combining affected areas of concurrent traffic events having overlapping affected areas can be performed repeatedly until the affected areas of all concurrent traffic events having overlapping affected areas are combined.

In some embodiments, the shape of the combined affected areas may be different than the shapes of the original individual affected areas. For example, the first and second affected areas may have circular shapes and the combined affected area may have an oval shape. As another example, the first and second affected areas may have irregular shapes and the combined affected area may have a circular shape. Furthermore, the first and second affected areas may have shapes that are different from one another.

Additionally, the shape of the combined affected areas may be different than the shape formed by simply combining the non-overlapping perimeters of the affected areas. For example, combining the affected areas may be performed such that a centroid calculated from the centers of each of the affected areas is the center of a circle having a radius that covers all affected areas, and the circle can be defined as the combined affected area. In such embodiments, the individual affected areas may have any shape, and the combined affected area has a circular shape. In some embodiments, a plurality of affected areas can be combined at once. For instances wherein there is only one traffic event, or the traffic prediction system is designed to address only a single traffic event, the method 100 does not include operation 108.

Figure 2B:
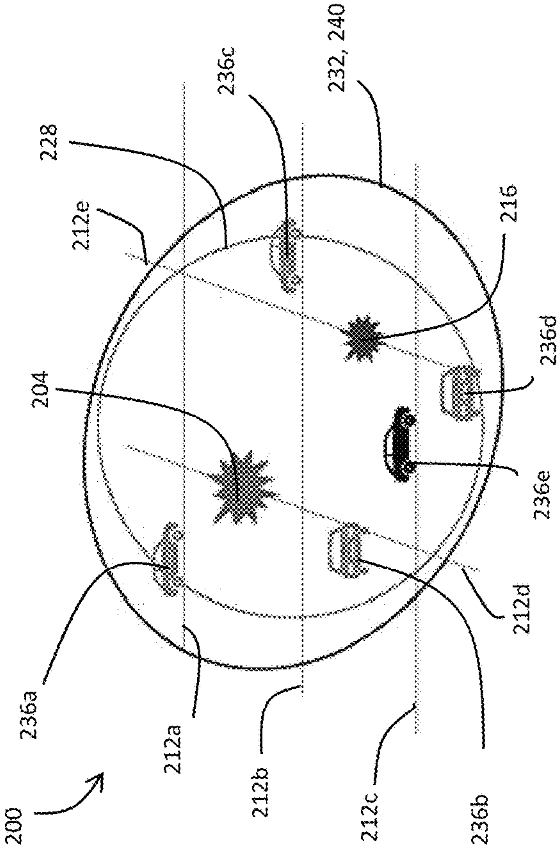
FIG. 2B depicts one of a series of views of multiple traffic events and surrounding areas as used in to illustrate the performance of a method for calculation of traffic flow changes for multiple traffic events, in accordance with embodiments of the present disclosure.

In the context of the illustrative map 200, because the affected areas 208 and 220 overlap at the overlapping portion 224, the traffic prediction system combines the affected areas 208 and 220 to form a combined affected area 228, shown in FIG. 2B. In this example, the combined affected area 228 is a circle having as its center a centroid calculated from the geographical points of occurrence 204 and 216 of each of the concurrent traffic events. The combined affected area 228 has a radius such that the combined affected area 228 includes all of the affected area 208 and all of the affected area 220. In addition to including all of the affected areas 208 and 220, the combined affected area 228 also includes portions of roads 212 that were not included in either of the affected areas 208, 220 but do fall within the radius of the combined affected area 228. This can account for the influence of the concurrent traffic events on roads and/or portions of roads 212 that neither traffic event has an appreciable impact on individually.

FIG. 2B further illustrates a combined influence area 232, which is larger than the combined affected area 228 and includes all of the combined affected area 228. In accordance with at least some embodiments of the present disclosure, combining the traffic event areas at operation 108 further includes generating such a combined influence area. Generating the combined influence area includes considering factors that may cause the impact of the concurrent traffic events to be greater than merely the sum of the impacts of the concurrent traffic events. In other words, the sum of the parts is greater than the whole.

After combining the affected areas at operation 108, the method 100 proceeds to operation 110, wherein the traffic prediction system determines a number of vehicles to be selected for measurement of traffic volume. As noted above, if it is determined at operation 106 that there are no overlapping affected areas, the method 100 also proceeds to operation 110 without performing operation 108. Additionally, in the case of more than two concurrent traffic events, operations 106 and 108 can be performed repeatedly until there are no more identified concurrent traffic events having overlapping affected areas.

Determining a number of vehicles to be selected for measurement of traffic volume includes determining a number of vehicles that will be observed such that the observations of those vehicles can be used to a measure traffic flow rate. It is noted that, for the purposes of this disclosure, the traffic flow rate is considered to be inversely proportionate to the traffic volume in a given area. In particular, the higher the volume of traffic in a given area, the lower the rate of flow of traffic in that area. In other words, the more dense the traffic in a given area, the slower the flow of traffic in that area. Conversely, the lower the volume of traffic in a given area, the higher the rate of flow of traffic in that area. In other words, the less dense the traffic in a given area, the faster the flow of traffic in that area. Accordingly, the disclosure can be expressed in terms of traffic volume or in terms of traffic flow rate by taking this inverse relationship into consideration.

Because the traffic volume in a particular area is a measurement of the number of cars in that area, determining the traffic volume in the affected area of a traffic event is a measurement of the number of cars in the affected area. Moreover, because the traffic flow rate is a measurement of the number of cars that passes through a particular area in a particular amount of time, determining the traffic flow rate in the affected area of a traffic event is a measurement of the number of cars that passes through the affected area in a particular amount of time.

Rather than observing the behavior of every vehicle in a particular area to measure the traffic volume or traffic flow rate, the traffic prediction system observes the behavior of a particular number of vehicles and then uses those observations of the particular number of vehicles to extrapolate and calculate an estimate of the traffic volume or traffic flow rate that can be considered to be an approximation that accounts for every vehicle in the particular area. Accordingly, as used herein, "measuring" the traffic volume or the traffic flow rate begins with determining the particular number of vehicles to select for observation. Accordingly, at operation 110, the particular number of vehicles is determined.

In accordance with at least some embodiments of the present disclosure, the determination of the number of vehicles to be selected for observation can be based on factors such as the event type(s), severity of the event(s), and affected area(s) (including a combined affected area of multiple events). In some embodiments, each factor can be given a numerical score. For example, each event type may have an associated score, the severity of a traffic event may be assigned a numerical value within a range of severity values, and an affected area can be given a numerical score based on area in square feet, meters, or other measurement of the affected geographical area. The numerical scores can be averaged, or a weighted average can be computed, and the result is converted into a number of vehicles to be selected for measurement of traffic volume.

In some embodiments, the number of vehicles to be selected can be based in part on the number of vehicles that are located physically near to the traffic event(s). For example, in such embodiments, the number of vehicles to be selected can be 10% of nearby vehicles, and this percentage can be modified upwardly or downwardly based on other factors. In accordance with at least one embodiment of the present disclosure, the number of vehicles to be selected can be a percentage of vehicles located in a particular area.

In some embodiments, the number of vehicles to be selected may depend on the road network near the traffic event. For example, when there are many routes for bypassing the traffic event, the number of vehicles to be selected can be increased to increase the odds of selecting vehicles which travel past the traffic event. Similarly, when, according to the past driving history, many vehicles are found to tend to bypass the location of the traffic event (in other words, the location of the traffic event is on a less traveled road segment compared to nearby road segments), the number of vehicles to be selected may be increased to increase the odds of selecting vehicles which travel past the traffic event.

At operation 112, the traffic prediction system calculates an investigation area in which the influence of the traffic event or traffic events is to be investigated. In accordance with at least some embodiments of the present disclosure, calculating the investigation area includes estimating a boundary within which the impact(s) of the traffic event on traffic volume and/or traffic flow rate can be measured to reliably represent the impact(s) of the traffic event on the traffic volume and/or traffic flow rate of the combined influence area.

In accordance with at least some embodiments of the present disclosure, the investigation area may be the same as the affected area of a traffic event (such as affected area 208 shown in FIG. 2A). In accordance with at least some embodiments of the present disclosure, the investigation area may be the same as the affected areas of multiple concurrent traffic events (such as affected areas 208 and 220 shown in FIG. 2A). In accordance with at least some embodiments of the present disclosure, the investigation area may be the same as the combined affected area of multiple concurrent traffic events (such as combined affected area 228 shown in FIG. 2B). In accordance with at least some embodiments of the present disclosure, the investigation area may be the same as the combined influence area (such as the combined influence area 232 shown in FIG. 2B).

The calculation performed at operation 112 can take into consideration factors such as the size of the traffic event(s). For example, the size of the traffic event(s) can be multiplied by a factor to reach the area of investigation. Additionally, or alternatively, this calculation can take into consideration one or more of the event type, event severity, whether multiple traffic events have been combined, or other factors relating to the traffic event(s). In some embodiments, an area larger than the combined influence area (232 in FIG. 2B) can be used to determine more accurately the area of investigation. The area of investigation can be any size or shape and does not have to be centered on the traffic event.

At operation 114, the traffic prediction system selects nearby vehicles based on the determined number of vehicles to be selected and the investigation area. As used herein, the term "nearby vehicles" refers to vehicles located in the investigation area. As explained in further detail below, these selected vehicles are observed to provide measurements of vehicles in real time.

The performance of operation 114 depends on the results of operations 110 and 112. More specifically, in order to select vehicles for observation that are likely to provide relevant information, the traffic prediction system selects vehicles within the investigation area calculated at operation 112. In order to select a minimum number of vehicles that is likely sufficient to provide accurately representative information, the traffic prediction system selects the number of vehicles determined at operation 110. In other words, by performing operation 114, the method 100 enables the computation load for selecting which vehicles to observe for the estimation of traffic volume to be reduced by selecting vehicles based on predicted transit.

In the context of the illustrative example shown in FIG. 2B, assume that the traffic prediction system calculated at operation 112 that the investigation area is coextensive with the combined influence area 232 and determined at operation 110 that the number of vehicles to be selected is 80% of the vehicles located in the investigation area (which is coextensive with the combined influence area 232). As shown, the map 200 of FIG. 2B includes five vehicles 236*a*, 236*b*, 236*c*, 236*d*, and 236*e* (any combination of which may be referred to herein as "vehicles 236") located within the investigation area. At operation 114, four of the five vehicles 236 (which is 80% of the vehicles located in the investigation area) located within the investigation area are selected by the traffic prediction system. By way of example, vehicles 236*a*, 236*b*, 236*c*, and 236*d* are selected.

More specifically, the traffic prediction system determines which vehicles of those located within the investigation area to select based on which vehicles are most likely to provide the greatest amount of relevant and/or representative information that can be used to estimate the impact of the traffic event(s). Therefore, in accordance with at least some embodiments of the present disclosure, operation 114 further includes, performing calculations for each vehicle in the investigation area. In particular, operation 114 can include calculating, for each vehicle, a trajectory pattern and driving behavior on the basis of past travel data. A trajectory pattern can include, for example, where the vehicle has come from and/or the route taken by the vehicle. In accordance with at least some embodiments of the present disclosure, the trajectory pattern and driving behavior can be calculated in advance of the method 100. Selecting nearby vehicles in operation 114 can then include predicting, based on the trajectory pattern, which vehicles will pass through a portion of a road (also referred to herein as a road segment) which is likely to be affected by the traffic event(s) (e.g., within the affected area(s), combined affected area, or combined influence area).

Figure 3A:
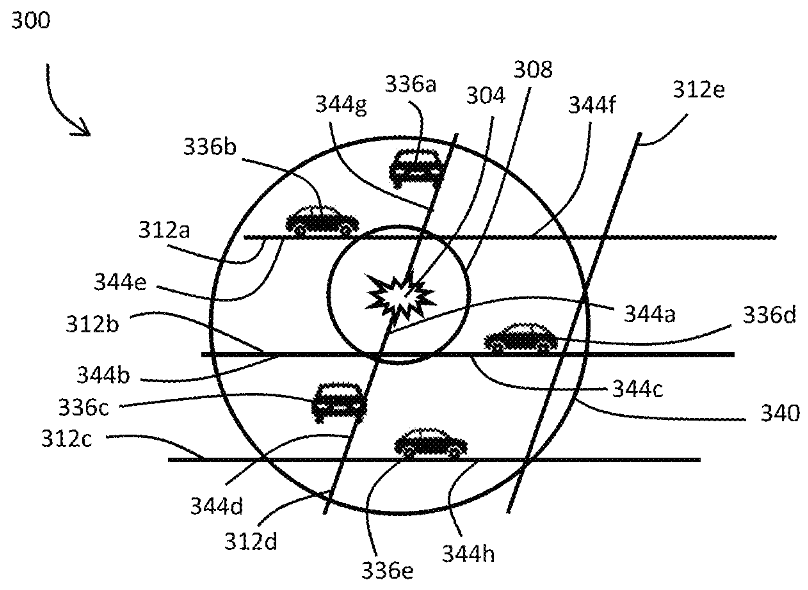
FIG. 3A depicts one of a series of views of a traffic event and surrounding areas for which calculation of traffic flow changes can be performed, in accordance with embodiments of the present disclosure.

For illustrative purposes, and by way of nonlimiting example, operation 114 can be further described in the context of a map 300 shown in FIG. 3A. The map 300 includes a geographical point of occurrence 304 of a traffic event, an affected area 308 of the traffic event, and an investigation area 340 of the traffic event. The map 300 further includes roads 312*a*, 312*b*, 312*c*, 312*d*, and 312*e* (any combination of which may be collectively referred to as "roads 312"). The roads 312 are further subdivided into portions referred to herein as links 344*a*, 344*b*, 344*c*, 344*d*, 344*e*, 344*f*, 344*g*, and 344*h* (any combination of which may be collectively referred to as "links 344"). Each link 344 represents a portion of a road 312. In particular, each link 344 may represent a portion of a road 312 between intersections with other roads 312.

As shown in FIG. 3A, the geographical point of occurrence 304 of the traffic event is on link 344*a*, and the investigation area 340 includes links 344*a*, 344*b*, 344*c*, 344*d*, 344*e*, 344*f*, 344*g*, and 344*h*. The map 300 further includes five vehicles 336*a*, 336*b*, 336*c*, 336*d*, and 336*e* (any combination of which may be collectively referred to as "vehicles 336") within the investigation area 340. In accordance with some embodiments of the present disclosure, at operation 114, the traffic prediction system calculates a trajectory pattern and/or driving behavior for each of the vehicles 336.

Figure 3B:
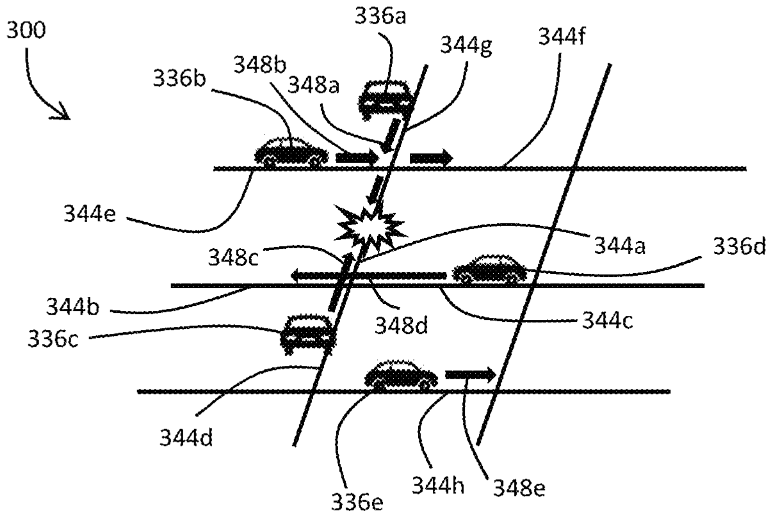
FIG. 3B depicts one of a series of views of a traffic event and surrounding areas for which calculation of traffic flow changes can be performed, in accordance with embodiments of the present disclosure.

As shown in FIG. 3B, based on the trajectory pattern and/or driving behavior of each vehicle 336, the traffic prediction system predicts a route 348 along which the respective vehicle 336 will travel. Each route 348 includes at least one link 344. As shown: vehicle 336*a* is predicted to travel along route 348*a*, which includes links 344*g* and 344*a*; vehicle 336*b* is predicted to travel along route 348*b*, which includes links 344*e* and 344*f*; vehicle 336*c* is predicted to travel along route 348*c*, which includes links 344*d* and 344*a*; vehicle 336*d* is predicted to travel along route 348*d*, which includes links 344*c* and 344*b*; and vehicle 336*e* is predicted to travel along route 348*e*, which includes link 344*h*.

In operation 114, each vehicle that is predicted to pass through a likely affected road segment (which is also referred to herein as a "link") can be scored based on the expected usefulness of a traffic volume measurement for that vehicle. This scoring can be based in part on the past driving behavior of the vehicle (e.g., acceleration/deceleration data, turning information, lane change information, etc.). Thus, at operation 114, the traffic prediction system can select the vehicle that has the highest scores and is predicted to pass through road segments near the traffic event(s). The traffic prediction system can continue selecting vehicles in this way until the traffic prediction system has selected a number of vehicles equal to the number of vehicles to be selected (determined at operation 110).

In the context of FIG. 3B, links 344*a*, 344*b*, 344*c*, 344*d*, 344*e*, 344*f*, and 344*g* are determined to be likely to be affected, while link 344*h* is determined to be unlikely to be affected. Accordingly, vehicle 336*a*, which is predicted to travel along links 344*g* and 344*a*, vehicle 336*b*, which is predicted to travel along 344*e* and 344*f*, vehicle 336*c*, which is predicted to travel along links 344*d* and 344*a*, and vehicle 336*d*, which is predicted to travel along links 344*c* and 344*b* are given higher scores based on the expected usefulness of their traffic volume measurements. In contrast, vehicle 336*e*, which is predicted to travel along link 344*h*, is given a lower score, because its traffic volume measurements are not expected to be useful.

In accordance with at least some embodiments of the present disclosure, given the lower score of vehicle 336*e*, the traffic prediction system will select vehicles 336*a*, 336*b*, 336*c*, and 336*d* (but not vehicle 336*e*) for further scoring to indicate the expected usefulness (also referred to as "value") of traffic volume measurements for those vehicles.

Further scoring can include, for example, assigning a value to each affected link depending on the likelihood that a vehicle will travel along the link which includes the geographical point of occurrence of the traffic event. For example, in FIG. 3B, vehicles 336*a* and 336*c* are scored higher than vehicles 336*b* and 336*d* because vehicles 336*a* and 336*c* are predicted to travel along link 344*a*, which includes the geographical point of occurrence 304 of the traffic event.

Further scoring can include, for example, assigning a value to the distance

The further scoring can include, for example, scoring the number of affected links covered by the predicted routes, the driving behavior, and other metadata pertaining to the vehicles. In such embodiments, the traffic prediction system considers this further scoring in its selection of vehicles that have the highest scores until the traffic prediction system has selected a number of vehicles equal to the number of vehicles to be selected.

In accordance with at least some embodiments of the present disclosure, selecting vehicles can include selecting at least one (or other threshold number) vehicle for each road segment in the investigation area. In other words, in such embodiments, the vehicles are selected such that each road segment is predicted to be traveled by at least one selected vehicle. In accordance with at least some embodiments of the present disclosure, selecting vehicles can include selecting at least one (or other threshold number) vehicle for each road segment in the investigation area that is likely to be affected. In some embodiments, a vehicle can be selected based in part on how many road segments the vehicle is predicted to travel on and how many of those road segments are predicted to be affected by the traffic event(s).

In accordance with at least some embodiments of the present disclosure, vehicles which are predicted to travel on multiple affected road segments can be prioritized such that greater coverage of the affected road segments can be achieved by fewer selected vehicles and/or the amount of useful data collected from the selected vehicles is increased.

In accordance with at least some embodiments of the present disclosure, lower scores can be given to vehicles when the number of sudden braking or sudden acceleration occurrences of the vehicle is found to be large according to the past driving behavior of the vehicle as this may indicate information received from the vehicle is unreliable or not representative of other vehicles in the investigation area.

At operation 116, the traffic prediction system requests data from the selected vehicles. The performance of operation 116 can include transmitting, to each of the selected vehicles, a request for one or more data values. In accordance with at least some embodiments of the present disclosure, operation 116 further includes receiving the requested data values.

Data values can be, for example, collected by a global positioning system (GPS) for each vehicle at identified intervals, which can be used by the traffic prediction system to determine accurate location information for the vehicles over time. Additionally, or alternatively, data values can be, for example, collected by a sensor used to detect acceleration/deceleration, turning information, camera information (e.g., vehicles with cameras used for self-driving technology, backup cameras, etc.), or any other information the traffic prediction system can use to monitor the impact of the traffic event(s).

At operation 118, the traffic prediction system uses the requested data from the selected vehicles to analyze the driving behavior and/or transit times for the selected vehicles in the event affected links. This analysis can vary. In accordance with at least some embodiments of the present disclosure, the analysis can include comparing data values for a particular selected vehicle with prior data values of the particular selected vehicle in the absence of a traffic event. For example, data values pertaining to transit times over event affected links for a particular selected vehicle can be compared with prior data pertaining to transit times of the particular selected vehicle over the same links in the absence of a traffic event. The analysis can be performed, for example, for the entire investigation area as a whole, for a portion or portions of the investigation area, or for each road segment in the investigation area.

The analysis performed at operation 118 provides an adjusted measured traffic volume or measured traffic flow rate, which takes into account the typical behavior of the same vehicles that are being selected for observation to provide the data values for the measured traffic volume or measured traffic flow rate. For example, vehicle 336*a*, which is selected for observation, may be driven by a driver who typically brakes and accelerates relatively abruptly. The analysis performed at operation 118 takes into account the typical abrupt braking and acceleration patterns of vehicle 336*a* to prevent the data values from vehicle 336*a* from being misinterpreted as indicative of an impact of a traffic event when they are, in fact, simply typical for that particular vehicle. Similarly, vehicle 336*b*, which is selected for observation, may be driven by a driver who typically drives relatively slowly. The analysis performed at operation 118 takes into account the typical slow speed patterns of vehicle 336*b* to prevent the data values from vehicle 336*b* from being misinterpreted as indicative of an impact of a traffic event when they are, in fact, simply typical for that particular vehicle. Similarly, vehicle 336*d*, which is selected for observation, may be a delivery vehicle, and therefore stop and idle relatively often, regardless of traffic conditions. The analysis performed at operation 118 takes into account the typical stopping and idling patterns of vehicle 336*d* to prevent the data values from vehicle 336*d* from being misinterpreted as indicative of an impact of a traffic event when they are, in fact, simply typical for that delivery vehicle.

Once the typical behavior of the selected vehicles is taken into consideration at operation 118, the method 100 proceeds to operation 120. At operation 120, the traffic prediction system compares a predicted traffic volume (or predicted traffic flow rate) with the adjusted measured traffic volume (or adjusted measured traffic flow rate) provided by the performance of operation 118. The adjusted measured traffic volume (or flow rate) can also be referred to as the current traffic volume (or flow rate). By comparing the predicted traffic volume (or flow rate) with the current traffic volume (or flow rate), it is possible to determine the actual, real-time impact of the traffic event.

The predicted traffic volume or traffic flow rate can be calculated by the traffic prediction system or can be a previously predicted traffic volume for the investigation area (such as the normal, expected traffic for the roads involved in the investigation area). As such, operation 120 can include receiving data values from vehicles in advance of a detected traffic event such that a baseline or normal traffic volume or traffic flow rate can be established and used as a predicted traffic volume or predicted traffic flow rate.

The predicted traffic volume (or flow rate) and the current traffic volume (or flow rate) can be used to calculate a difference in the traffic volume or traffic flow rate. As noted above, this difference is indicative of the impact of the traffic event. Moreover, the magnitude of the difference can indicate the magnitude of the impact of the traffic event, which can be used to adjust expectations of the impact of the traffic event.

In some embodiments, the difference in traffic volume can be calculated for each road segment of the investigation area to provide more detailed information regarding the impact of the traffic event on each road and road segment.

At operation 122, the traffic prediction system uses the comparison of operation 120 to predict changes in traffic volume for nearby roads due to the traffic event(s). More specifically, in accordance with at least some embodiments of the present disclosure, the traffic prediction system uses the difference calculated in the performance of operation 120 to predict changes in traffic volume for nearby roads. In accordance with at least some embodiments of the present disclosure, the traffic prediction system uses the magnitude of the difference to predict changes in traffic volume for nearby roads. For example, a larger magnitude may lead to a prediction that a larger number of nearby roads will experience changes in traffic volume. Additionally, or alternatively, a larger magnitude may lead to a prediction that nearby roads will experience a greater change in traffic volume.

Moreover, in the same manner, the magnitude of the difference can be used to predict the propagation of the impact of a traffic event. In accordance with at least some embodiments of the present disclosure, the traffic prediction system can predict the propagation of the impact of a traffic event using the predictions of changes in traffic volume for nearby roads.

Predicting changes in traffic volume for nearby roads can include using the calculated difference in a simulation algorithm, such as using known techniques, to calculate a traffic volume change due to the traffic event(s). Predicting changes in traffic volume for nearby roads can involve simulation using traffic volume at each road at each time (e.g., the prior time and the measured time).

At operation 124, based on the predicted changes in traffic volume and/or predicted propagation of the impacts thereof, the traffic prediction system recalculates the affected area of the traffic event(s). This recalculation can provide an updated affected area or updated combined affected area of the traffic event(s) based on the predicted changes in traffic volume. For example, it is possible that, at operation 122, a traffic event is predicted to have an impact on a larger area than was originally determined at operation 104, due to propagation of the traffic event. Accordingly, at operation 124, the affected area of such a traffic event is recalculated and is increased. For instances wherein the traffic event is predicted to have an impact on a smaller area than was originally determined at operation 104, the affected area of such a traffic event is recalculated and is decreased. For a traffic event which is predicted to have minimal or insignificant effects on road segments outside the previously calculated affected area, recalculating the affected area may not result in a change of the affected area.

At operation 126, the traffic prediction system determines whether the recalculated affected area is greater than a predetermined threshold area. The predetermined threshold area is selected so as to indicate whether the effects of a traffic event continue to justify performing the method 100. More specifically, when the recalculated affected area is smaller than the predetermined threshold area, this indicates that the effects of the traffic event no longer justify performing the method 100. Accordingly, in such instances, the method 100 proceeds to end 128.

In contrast, when the recalculated affected area is larger than the predetermined threshold area, this indicates that the effects of the traffic event continue to justify performing the method 100. Accordingly, in such instances, the method 100 returns to operation 106 wherein it is determined whether there is another concurrent traffic event and, if so, compares the recalculated affected area with the affected area of each other concurrent traffic events to determine whether there is an area of overlap where the affected areas are coincident.

Figure 4:
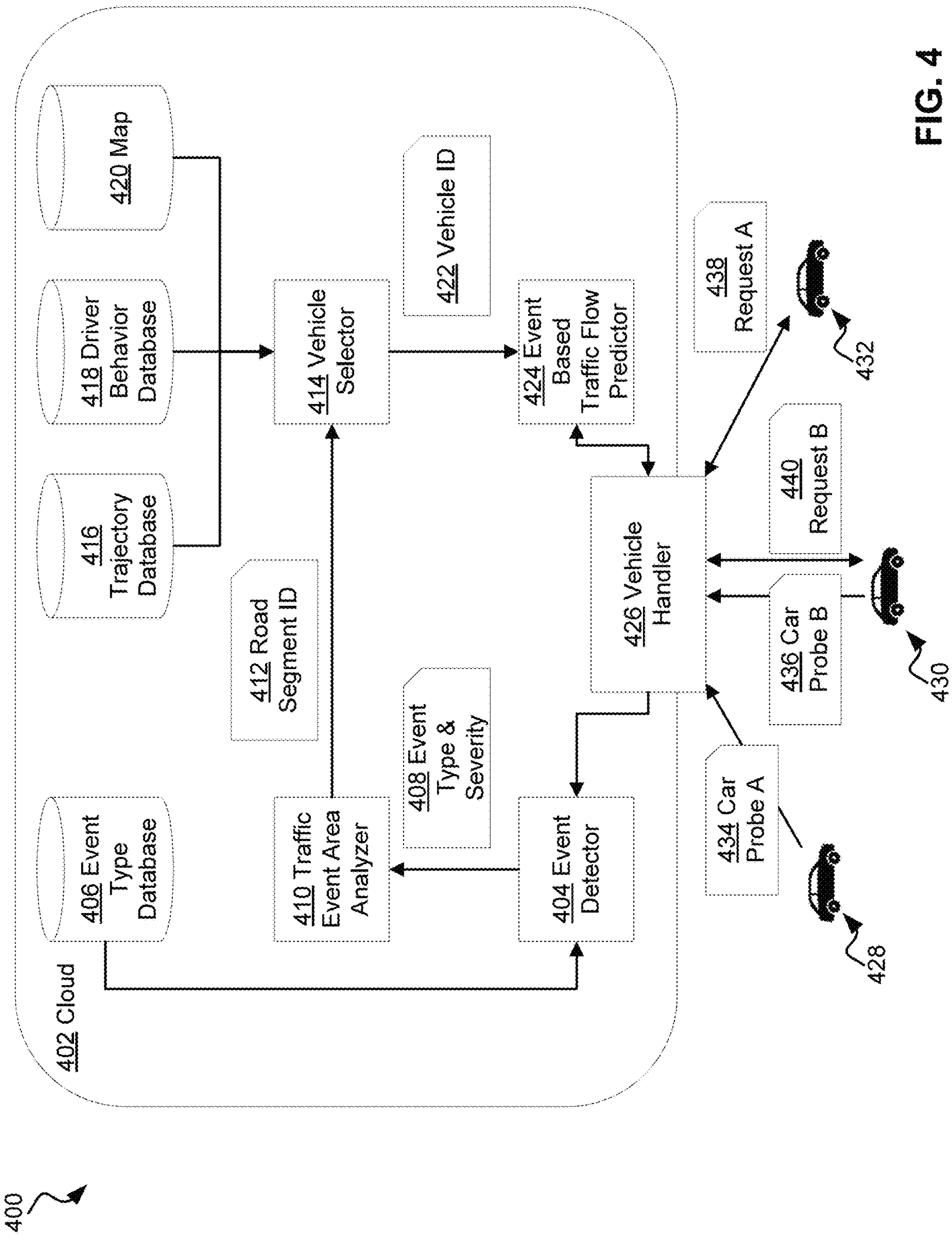
FIG. 4 depicts a block diagram of a traffic prediction system including interactions with a plurality of vehicles for use with a method for calculation of traffic flow changes for multiple traffic events, in accordance with embodiments of the present disclosure.

Referring now to FIG. 4, depicted is a block diagram of a traffic prediction system 400 including interactions with a plurality of vehicles 428, 430, 432 for use with a method for calculating traffic flow changes for multiple traffic events. The traffic prediction system 400 includes cloud 402. Cloud 402 can be consistent with all or a portion of a cloud computing system such as that described below with regard to FIGS. 7 and 8. Cloud 402 can include a multitude of components of the traffic prediction system 400.

Included within cloud 402 is an event detector 404, which can be a component configured to detect traffic events and/or receive information indicating that a traffic event is occurring. The event detector 404 can receive signal(s) or other information from one or more vehicles involved in a traffic event indicating the presence of a traffic event. These signals can be routed through a vehicle handler 426, discussed below. Such signals can include information that an accident has occurred, that traffic volume has increased, that average speeds on one or more road segments have decreased, or any other information which can be used in detecting a traffic event.

In some embodiments, the event detector 404 can utilize outside sources for detecting events, such as news, law enforcement, emergency services, or other traffic monitoring entities. In some embodiments, the event detector 404 can utilize camera and/or satellite technology to visually recognize a traffic event is occurring. In some embodiments, the event detector 404 can use machine learning technology to perform object recognition to detect a traffic event from images received from, for example, the camera and/or satellite technology. This can include feeding a corpus of images of traffic accidents, traffic jams, or other images which relate to traffic events to a machine learning program for use in detecting traffic events. The event detector 404 can also determine an event severity for detected events. Various embodiments involving event severity levels are discussed above regarding operation 104 of method 100 of FIG. 1.

The event detector 404 can pull information from an event type database 406 in detecting traffic events. The event type database 406 can include event types such as accidents, traffic jams, lane closures (e.g., due to road construction or obstructions on a road), wild animal crossings, or any other type of event the traffic prediction system 400 is configured to detect. The event type database 406 can include information relating to the event types, such as expected durations of each of the event types, average size of areas of effect for each event type, historical data regarding number of vehicles selected for each event type, etc.

The traffic prediction system 400 can transmit event type and severity data 408 from the event detector 404 to a traffic event area analyzer 410. This data can be that received by or determined by the event detector 404 and/or any related data from event type database 406 or any other sources. The traffic event area analyzer 410 can use event type and severity data 408 in performing analysis of the traffic event to determine an affected area of the traffic event. Calculation of the affected area of the traffic event can use an algorithm combining one or more of the event type, severity level, or other factors, such as that described above with regard to operation 104 of method 100 of FIG. 1. In some embodiments, the traffic event area analyzer 410 can also determine whether, if multiple traffic events are occurring, two or more traffic event areas overlap.

The traffic event area analyzer 410 can determine which road segment(s) are involved in the traffic event and/or are present in the area affected by the traffic event. The road segments can be associated with a road segment ID (identification) 412, which can be transmitted from the traffic event area analyzer 410 to a vehicle selector 414. In some embodiments, each road segment in an area in which traffic prediction system 400 operates (e.g., a metropolitan area, a state, a nation, or other geographic area) can be given a road segment ID, and the traffic event area analyzer can access a list or database of such road segment IDs to identify the relevant road segment IDs 412. In some embodiments, the list of or database of such road segment IDs can be contained within a map 420.

The vehicle selector 414 can receive the road segment IDs 412 of the road segments involved in the traffic event area and use these in selecting vehicle(s) to investigate the traffic condition of the road segments affected by the traffic event (s). In some embodiments, the vehicle selector 414 can be responsible for determining the number of vehicles to be selected. This determination can be substantially similar to that discussed above with regard to operation 110 of method 100 of FIG. 1.

The vehicle selector 414 can also use one or more of a trajectory database 416, a driver behavior database 418, and the map 420 in selecting vehicles. The selection of vehicles by the vehicle selector 414 can be performed with a goal of selecting vehicles that are useful for investigation of the traffic event area. The driving history and/or predicted paths of vehicles can be stored in the trajectory database 416 and accessed by the vehicle selector 414 to determine which vehicles are likely to travel on road segments likely to be affected by the traffic event(s).

The driver behavior and/or vehicle behavior database 418 can store information relating to, e.g., acceleration/deceleration data, turning information, lane change information, or other information regarding the behavior of the vehicle or person driving the vehicle, and this can be accessed by the vehicle selector 414 to determine vehicles more likely to brake or turn away from a traffic accident as compared to those more likely to stay on course. This information can increase the reliability of selecting vehicles which are predicted to travel over the road segments to be analyzed. The vehicle selector 414 can also use the map 420 in selecting vehicles by comparing vehicle locations, trajectories, the road segments corresponding to road segment IDs 412, and any other location based information which can be used with a map. In some embodiments, the vehicle selector 414 can select vehicles in a manner consistent with that described above with regard to operation 114 of method 100 of FIG. 1.

The vehicle selector 414 can transmit one or more vehicle IDs 422 corresponding to the vehicles selected for investigation. The vehicle IDs 422 can take many forms in embodiments, including numerical IDs, descriptions of the vehicles, license plate information for the vehicles, or any other identifying feature of the vehicles.

The vehicle IDs 422 of the selected vehicles can be sent to an event based traffic flow predictor 424. The event based traffic flow predictor 424 can predict changes in traffic volume for roads affected by the traffic event(s), including road segments corresponding to the road segment IDs 412. Prediction of changes in traffic volume by the event based traffic flow predictor 424 can use any of the information available to the traffic prediction system 400, including the traffic event(s) detected, traffic event type and severity 408, road segment IDs 412, vehicle IDs 422 and all information received from these vehicles (which may pass through the vehicle handler 426), and/or any of the databases stored within the cloud 402.

The event based traffic flow predictor 424 can request that the vehicle handler 426 obtain information from the vehicles corresponding to the vehicle IDs 422. This can include sending a request through the vehicle handler 426 to the vehicles for one or more measurement values and can be consistent with the request of operation 116 of method 100 of FIG. 1. In some embodiments, the event based traffic flow predictor 424 can obtain additional information needed for the prediction if necessary, by sending additional requests.

The vehicle handler 426 can be an interface between the cloud 402 of the traffic prediction system 400 and associated vehicles, such as vehicles 428, 430, and 432. The vehicle handler 426 can send requests, such as request A 438 and request B 440 to vehicles 432 and 430 respectively. These requests can be based on information the vehicle handler 426 has received from the event based traffic flow predictor 424 to be used in predicting traffic flow for the identified traffic event(s). In some embodiments, the vehicle handler 426 can request information from one or more vehicles when determining if a traffic event is occurring and pass received information to the event detector 404.

The vehicles (including vehicles 428, 430, and 432) can send measured information to the vehicle handler 426. Depicted in FIG. 4, the vehicle 428 sends car probe data A 434 and vehicle 430 sends car probe data B 436 to the vehicle handler 426, while vehicles 430 and 432 respond to their respective requests (as indicated by the return arrow to the vehicle handler 426). Car probe data A 434 and car probe data B 436 can be information from the corresponding vehicles sent to the vehicle handler 426 in the absence of a specific request and can be data sent to aid in the detection of traffic events and creation of the trajectory database 416 and driver behavior database 418. This information can vary in embodiments and can include information including GPS coordinates or other location information, route plans (such as those created by a navigation assistance program relating to the vehicle), acceleration/deceleration data, or any other data of use to the traffic prediction system 400. This information can be sent at preselected time intervals such that traffic prediction system 400 is continually receiving this information to improve the report of the impact of the traffic event.

Figures 5A, 5B, 5C, 5D, 5E, 5F:
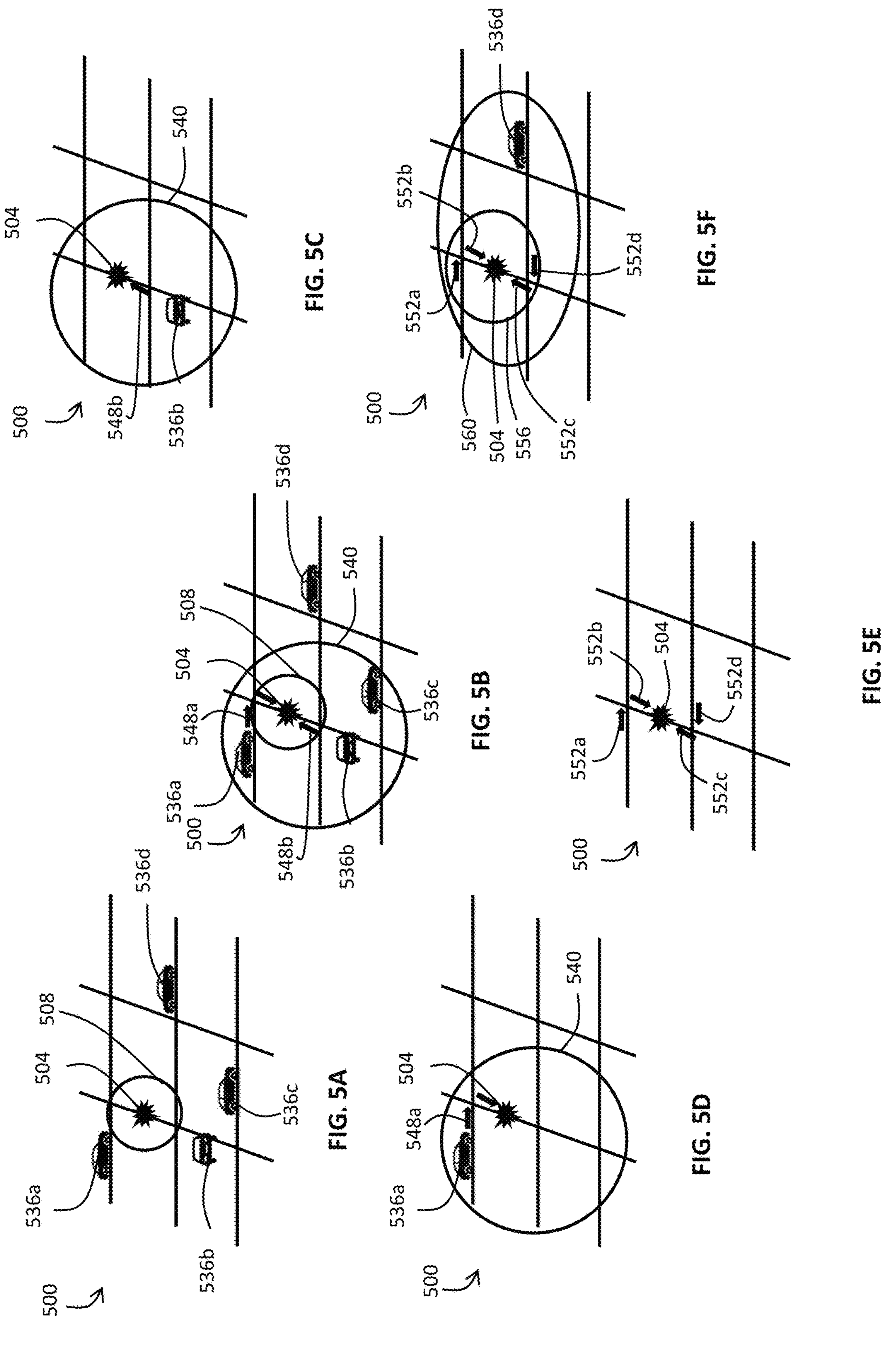
FIG. 5A depicts one of a series of views of a single traffic event and surrounding areas as used in performance of a method for calculation of traffic flow changes for a traffic event, in accordance with embodiments of the present disclosure.
FIG. 5B depicts one of a series of views of a single traffic event and surrounding areas as used in performance of a method for calculation of traffic flow changes for a traffic event, in accordance with embodiments of the present disclosure.
FIG. 5C depicts one of a series of views of a single traffic event and surrounding areas as used in performance of a method for calculation of traffic flow changes for a traffic event, in accordance with embodiments of the present disclosure.
FIG. 5D depicts one of a series of views of a single traffic event and surrounding areas as used in performance of a method for calculation of traffic flow changes for a traffic event, in accordance with embodiments of the present disclosure.
FIG. 5E depicts one of a series of views of a single traffic event and surrounding areas as used in performance of a method for calculation of traffic flow changes for a traffic event, in accordance with embodiments of the present disclosure.
FIG. 5F depicts one of a series of views of a single traffic event and surrounding areas as used in performance of a method for calculation of traffic flow changes for a traffic event, in accordance with embodiments of the present disclosure.

Referring now to FIGS. 5A-5F, depicted is a series of views of a single traffic event and surrounding areas as used in performance of a method for calculating traffic flow changes for a traffic event. FIG. 5A includes a map 500, on which are indicated a geographical point of occurrence 504 of a traffic event, an affected area 508 of the traffic event, and a plurality of nearby vehicles 536*a*, 536*b*, 536*c*, and 536*d*.

Calculating traffic flow changes for a traffic event, such as by method 100 of FIG. 1, begins by detecting a traffic event, such as by operation 102, identifying the geographical point of occurrence 504 of the detected traffic event, and calculating an affected area 508 of the detected traffic event, such as by operation 104. As described above with reference to operation 104, the affected area 508 is an area surrounding the geographical point of occurrence 504 of the detected traffic event, and the size and shape of the affected area 508 can be determined as described above with regard to operation 104 of method 100 of FIG. 1.

FIG. 5B includes the same elements as FIG. 5A in addition to an investigation area 540 and predicted routes 548*a* and 548*b* for two of the vehicles 536*a* and 536*b*, respectively. The investigation area 540 can be calculated in accordance with operation 112 of method 100 of FIG. 1. Predicted routes for the vehicles nearest to the geographical point of occurrence 504 of the traffic event can be calculated as part of the selection of vehicles, as described above with respect to operation 114 of method 100 of FIG. 1 and discussed further in the description of FIGS. 3A and 3B above. The predicted routes 548*a* and 548*b* of the two vehicles 536*a* and 536*b* which are predicted to pass through road segments likely to be affected by the detected traffic event are depicted in FIG. 5B.

In FIG. 5C only vehicle 536*b* and its corresponding route 548*b* are shown. Because the traffic prediction system has predicted that vehicle 536*b* traveling along this route 548*b* is likely to be affected by the impacts of the detected traffic event, the vehicle 536*b* is selected for observation by the traffic prediction system. Accordingly, in a manner such as that described above with respect to operation 116 of method 100 of FIG. 1, the traffic prediction system can request data values from vehicle 536*b*.

As an illustrative example, data values can be measured which pertain to the time it takes vehicle 536*b* to pass from its starting location, through the investigation area 540 and/or through the affected area 508. Additionally, or alternatively, data values can be measured which pertain to the driving behavior of vehicle 536*b* during the time it is passing through the investigation area 540 and/or the affected area 508. In some embodiments, data values can continue to be measured until vehicle 536*b* exits the investigation area 540 and/or when the data values no longer differ from predicted or expected data values that would be measured in the absence of a traffic event. These data values can be transmitted to the traffic prediction system in response to the request for data values.

In FIG. 5D only vehicle 536*a* and its corresponding route 548*a* are shown. Because the traffic prediction system has predicted that vehicle 536*a* traveling along this route 548*a* is likely to be affected by the impacts of the detected traffic event, the vehicle 536*a* is selected for observation in a manner substantially similar to that described above with respect to vehicle 536*b*. Furthermore, the same requesting, taking, and transmitting of data values described above with regard to vehicle 536*b* can be performed for vehicle 536*a* (and any other selected vehicle in the investigation area 540).

FIG. 5E depicts the geographical point of occurrence 504 of the detected traffic event without any particular vehicles to indicate that the traffic prediction system can use the data values that it is has acquired to calculate a degree and extent of a reduction in the traffic flow rate relative to a traffic flow rate that was predicted in advance to estimate a real-time traffic flow rate, such as is described above with respect to operation 122 of method 100 of FIG. 1. In other words, FIG. 5E indicates that the traffic prediction system can predict a propagation of the impacts of the effects of the detected traffic event. More specifically, the arrows 552*a*, 552*b*, 552*c*, and 552*d* shown in FIG. 5E indicate the predicted effects of the detected traffic event. In particular, arrow 552*d* indicates predicted propagation of the effects of the detected traffic event.

As such, FIG. 5F shows a recalculated affected area 556, which results from recalculating the affected area, such as at operation 124 of the method 100 of FIG. 1. Additionally, FIG. 5F includes an updated investigation area 560 which results from recalculating the investigation area, such as at operation 112 of the method 100 of FIG. 1 after the method 100 has returned to operation 106 following the determination at operation 126 that the recalculated affected area is greater than the predetermined threshold area.

The recalculated affected area 556 includes the geographical point of occurrence 504 of the traffic event as well as a greater portion of the map 500 than was included in the originally calculated affected area 508. The updated investigation area 560 includes the recalculated affected area 556 as well as vehicle 536*d*, which was previously excluded by the originally calculated investigation area 540. As shown, the traffic prediction system can recalculate the affected area of a traffic event based on an estimated nearby traffic volume (or flow rate) and update the investigation area accordingly. As shown, the updated investigation area can include additional or different vehicles than were initially included in the originally calculated investigation area. Once the investigation area is updated in this manner, the traffic prediction system can proceed with the same method 100 at operation 114 to select additional vehicles, obtain additional data values, and perform additional calculations, thereby continuing to update the traffic flow predictions in real time.

Figure 6A:
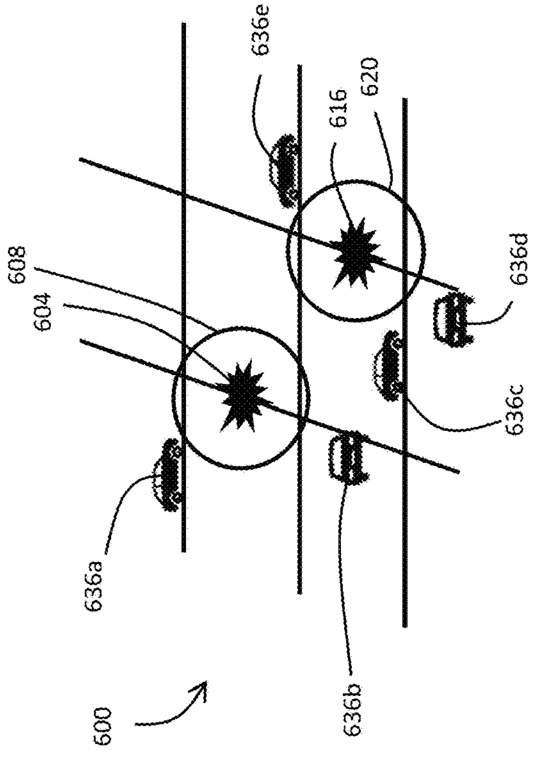
FIG. 6A depicts one of a series of views of multiple traffic events and surrounding areas as used in performance of a method for calculation of traffic flow changes for multiple traffic events, in accordance with embodiments of the present disclosure.
Figure 6B:
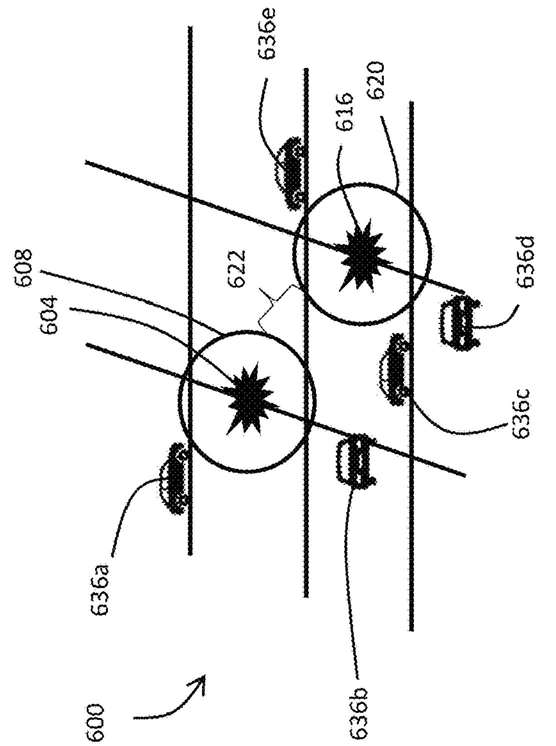
FIG. 6B depicts one of a series of views of multiple traffic events and surrounding areas as used in performance of a method for calculation of traffic flow changes for multiple traffic events, in accordance with embodiments of the present disclosure.
Figure 6C:
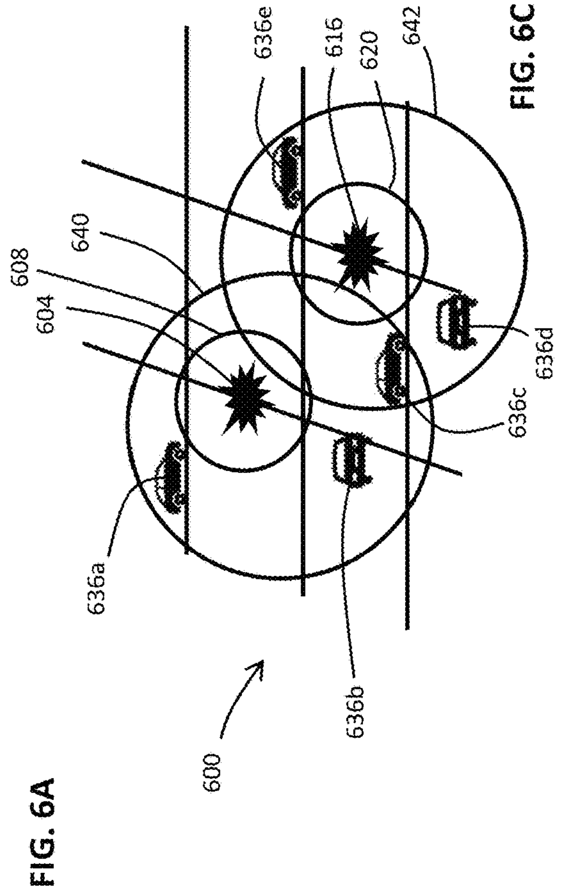
FIG. 6C depicts one of a series of views of multiple traffic events and surrounding areas as used in performance of a method for calculation of traffic flow changes for multiple traffic events, in accordance with embodiments of the present disclosure.

Referring now to FIGS. 6A-6C, depicted is a series of views of multiple traffic events and surrounding areas as used in performance of a method for calculating traffic flow changes for multiple traffic events. FIG. 6A includes a map 600, on which are indicated a geographical point of occurrence 604 of a first traffic event, an additional geographical point of occurrence 616 of an additional traffic event, an affected area 608 surrounding the first traffic event, an additional affected area 620 surrounding the additional traffic event, and a plurality of nearby vehicles 636*a*, 636*b*, 636*c*, 636*d*, and 636*e*.

Calculating traffic flow changes for multiple traffic events, such as by method 100 of FIG. 1, begins by detecting multiple concurrent traffic events, such as by operation 102, identifying the geographical point of occurrence 604, 616 of each of the detected traffic events, and calculating an affected area 608, 620 of each of the detected traffic events, such as by operation 104. In some embodiments, these detections, identifications, and calculations can occur for each traffic event simultaneously. In some embodiments, these detections, identifications, and calculations can occur sequentially, such as by starting with a traffic event which is detected first or with a traffic event which has a higher severity level. As noted above with reference to operation 104, the affected areas 608 and 620 surround the geographical point of occurrence 604, 616 of their respective traffic events, and the sizes and shapes of the affected areas can be determined as described above with regard to operation 104 of method 100 of FIG. 1.

FIG. 6B includes the same elements as FIG. 6A in addition to a gap 622. Accordingly, the determination made at operation 106 of method 100, namely whether the calculated affected areas of concurrent traffic events overlap, is "No." In other words, the gap 622 indicates that the affected areas of the concurrent traffic events do not overlap.

As such, FIG. 6C shows a separate investigation area 640, 642 calculated for each of the traffic events. In other words, each investigation area 640, 642 is determined independently, and a traffic prediction method, such as method 100 of FIG. 1, can thereafter proceed independently for each of the two detected traffic events. Investigation areas 640 and 642 can be determined in accordance with operation 112 of method 100 of FIG. 1, for their respective detected traffic events.

Predicted routes for the vehicles nearest to the geographical point of occurrence 604, 616 of each detected traffic event can be calculated as part of the selection of vehicles, as described above with respect to operation 114 of method 100 of FIG. 1 and discussed further in the description of FIGS. 3A and 3B above. The predicted routes of vehicles 636 can be used to determine which vehicles are predicted to pass through road segments likely to be affected by the detected traffic events. After selecting those vehicles and collecting data values pertaining to those vehicles, the traffic prediction system can perform the remainder of method 100 shown in FIG. 1.

In contrast to the scenario depicted in FIGS. 6A-6C, referring back to FIGS. 2A and 2B, the affected areas 208 and 220 do overlap at overlapping portion 224. Accordingly, in the context of FIGS. 2A and 2B, the determination made at operation 106 of the method 100, namely whether the calculated affected areas of concurrent traffic events overlap, is "Yes." In other words, the overlapping portion 224 shown in FIG. 2A indicates that the affected areas of the concurrent traffic events do overlap. As such, as discussed above, FIG. 2B shows a combined influence area 232, which can also be used as a combined investigation area 240 determined such as at operation 112 of method 100 of FIG. 1.

Figure 7:
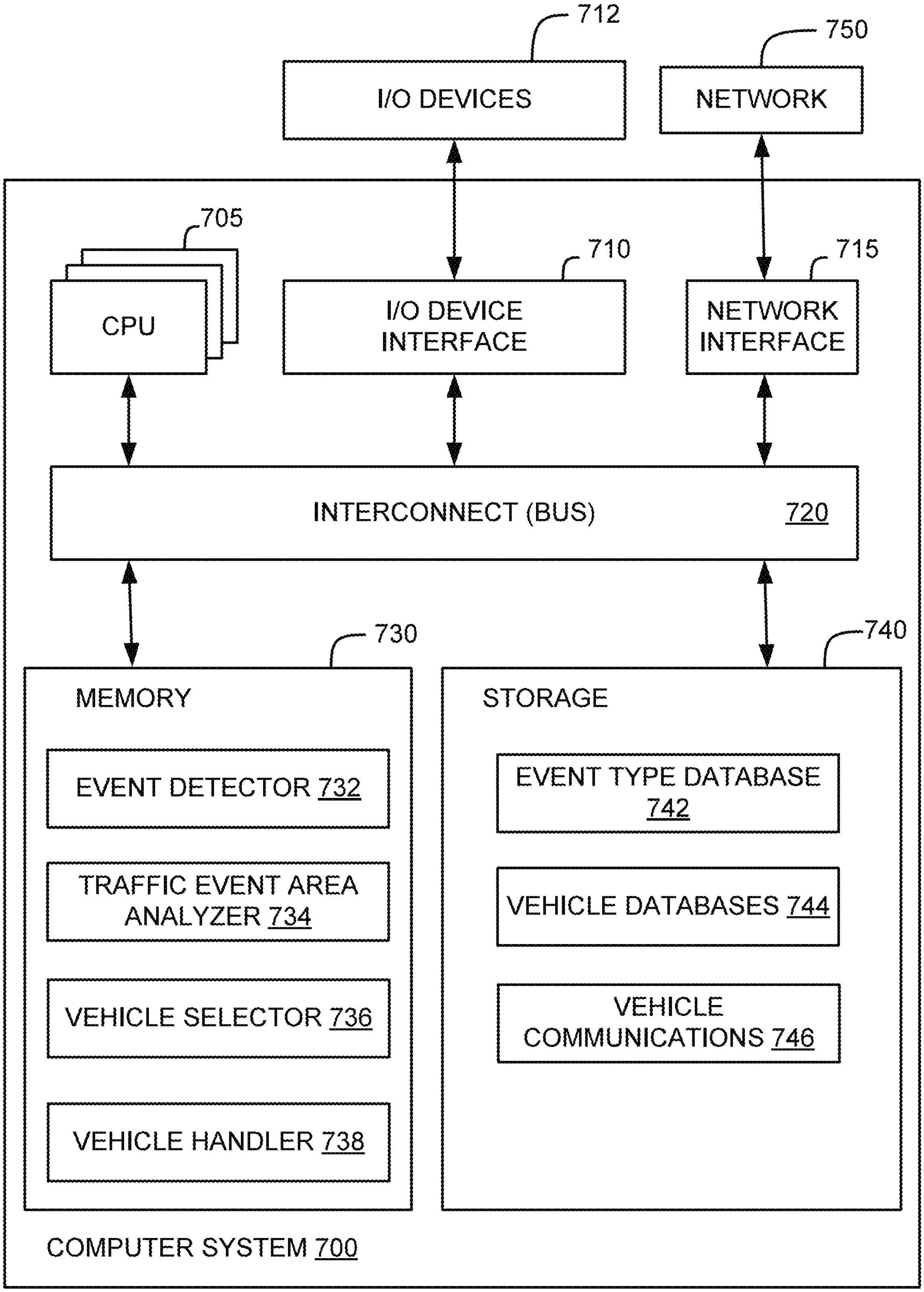
FIG. 7 illustrates a block diagram of a computer system, in accordance with some embodiments of the present disclosure.

Referring now to FIG. 7, illustrated is a block diagram of a computer system 700, in accordance with some embodiments of the present disclosure. In some embodiments, computer system 700 performs operations in accordance with method 100 of FIG. 1 as described above. In some embodiments, computer system 700 can be part of a cloud computing environment such as that described with regard to FIGS. 8 and 9 below. The computer system 700 can include one or more processors 705 (also referred to herein as CPUs 705), an I/O device interface 710 which can be coupled to one or more I/O devices 712, a network interface 715, an interconnect (e.g., BUS) 720, a memory 730, and a storage 740.

In some embodiments, each CPU 705 can retrieve and execute programming instructions stored in the memory 730 or storage 740. The interconnect 720 can be used to move data, such as programming instructions, between the CPUs 705, I/O device interface 710, network interface 715, memory 730, and storage 740. The interconnect 720 can be implemented using one or more busses. Memory 730 is generally included to be representative of a random access memory (e.g., static random access memory (SRAM), dynamic random access memory (DRAM), or Flash).

In some embodiments, the memory 730 can be in the form of modules (e.g., dual in-line memory modules). The storage 740 is generally included to be representative of a non-volatile memory, such as a hard disk drive, solid state device (SSD), removable memory cards, optical storage, or flash memory devices. In an alternative embodiment, the storage 740 can be replaced by storage area-network (SAN) devices, the cloud, or other devices connected to the computer system 700 via the I/O devices 712 or a network 750 via the network interface 715.

The CPUs 705 can be a single CPU, multiple CPUs, a single CPU having multiple processing cores, or multiple CPUs with one or more of them having multiple processing cores in various embodiments. In some embodiments, a processor 705 can be a digital signal processor (DSP). The CPUs 705 can additionally include one or more memory buffers or caches (not depicted) that provide temporary storage of instructions and data for the CPUs 705. The CPUs 705 can be comprised of one or more circuits configured to perform one or more methods consistent with embodiments of the present disclosure.

The memory 730 of computer system 700 includes event detector 732, traffic event area analyzer 734, vehicle selector 736, and vehicle handler 738. Event detector 732 can be an application or compilation of computer instructions for detection of one or more traffic events. Event detector 732 can be substantially similar to event detector 404 of FIG. 4 and can perform operations consistent with that described above with regard to operation 102 of method 100 of FIG. 1.

Traffic event area analyzer 734 can be an application or compilation of computer instructions for analyzing a traffic event area. Traffic event area analyzer 734 can be substantially similar to traffic event area analyzer 410 of FIG. 4 and can perform operations consistent with that described above with regard to method 100 of FIG. 1, such as operations 104-108.

Vehicle selector 736 can be an application or compilation of computer instructions for selection of one or more vehicles to be used with the computer system 700. Vehicle selector 736 can be substantially similar to vehicle selector 414 of FIG. 4 and can perform operations consistent with that described above with regard to method 100 of FIG. 1, such as operations 110 and 114.

Vehicle handler 738 can be an application or compilation of computer instructions for interfacing with one or more vehicles including sending requests for measurements, receiving replies to such requests, and receiving car probe data. Vehicle handler 738 can be substantially similar to vehicle handler 426 of FIG. 4 and can perform operations consistent with that described above with regard to method 100 of FIG. 1, such as operation 116.

The storage 740 of computer system 700 includes event type database 742, vehicle databases 744, and vehicle communications 746. Event type database 742 can be a storage repository for information relating to types of traffic events and any related data about these types of traffic events. Event type database 742 can be substantially similar to event type database 406 of FIG. 4.

Vehicle databases 744 can be one or more databases with information relating to vehicles to be used by computer system 700. Vehicle databases can include a trajectory database, a driver behavior database, a map database, or any other database relating to vehicle information. These databases can be substantially similar to trajectory database 416, driver behavior database 418, and map 420 of FIG. 4.

Vehicle communications 746 can be requests from computer system 700 to one or more vehicles, such as request A 438 and request B 440 of FIG. 4 and any return information from these vehicles. Vehicle communications can also include information received from vehicles such as car probe A 434 and car probe B 436 of FIG. 4, which can be information sent by vehicles to computer system 700 in the absence of a specific request and can be used for determination of whether a traffic event has occurred and used in creating vehicle databases 744.

In some embodiments as discussed above, the memory 730 stores event detector 732, traffic event area analyzer 734, vehicle selector 736, and vehicle handler 738 and the storage 740 stores event type database 742, vehicle databases 744, and vehicle communications 746. However, in various embodiments, event detector 732, traffic event area analyzer 734, vehicle selector 736, vehicle handler 738, event database 742, vehicle databases 744, and vehicle communications 746 are stored partially in memory 730 and partially in storage 740, or they are stored entirely in memory 730 or entirely in storage 740, or they are accessed over a network 750 via the network interface 715.

In various embodiments, the I/O devices 712 can include an interface capable of presenting information and receiving input. For example, I/O devices 712 can receive input from a user and present information to a user and/or a device interacting with computer system 700.

The network 750 can connect (via a physical or wireless connection) the computer system 700 with other networks, and/or one or more devices that interact with the computer system.

Logic modules throughout the computer system 700—including but not limited to the memory 730, the CPUs 705, and the I/O device interface 710—can communicate failures and changes to one or more components to a hypervisor or operating system (not depicted). The hypervisor or the operating system can allocate the various resources available in the computer system 700 and track the location of data in memory 730 and of processes assigned to various CPUs 705. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
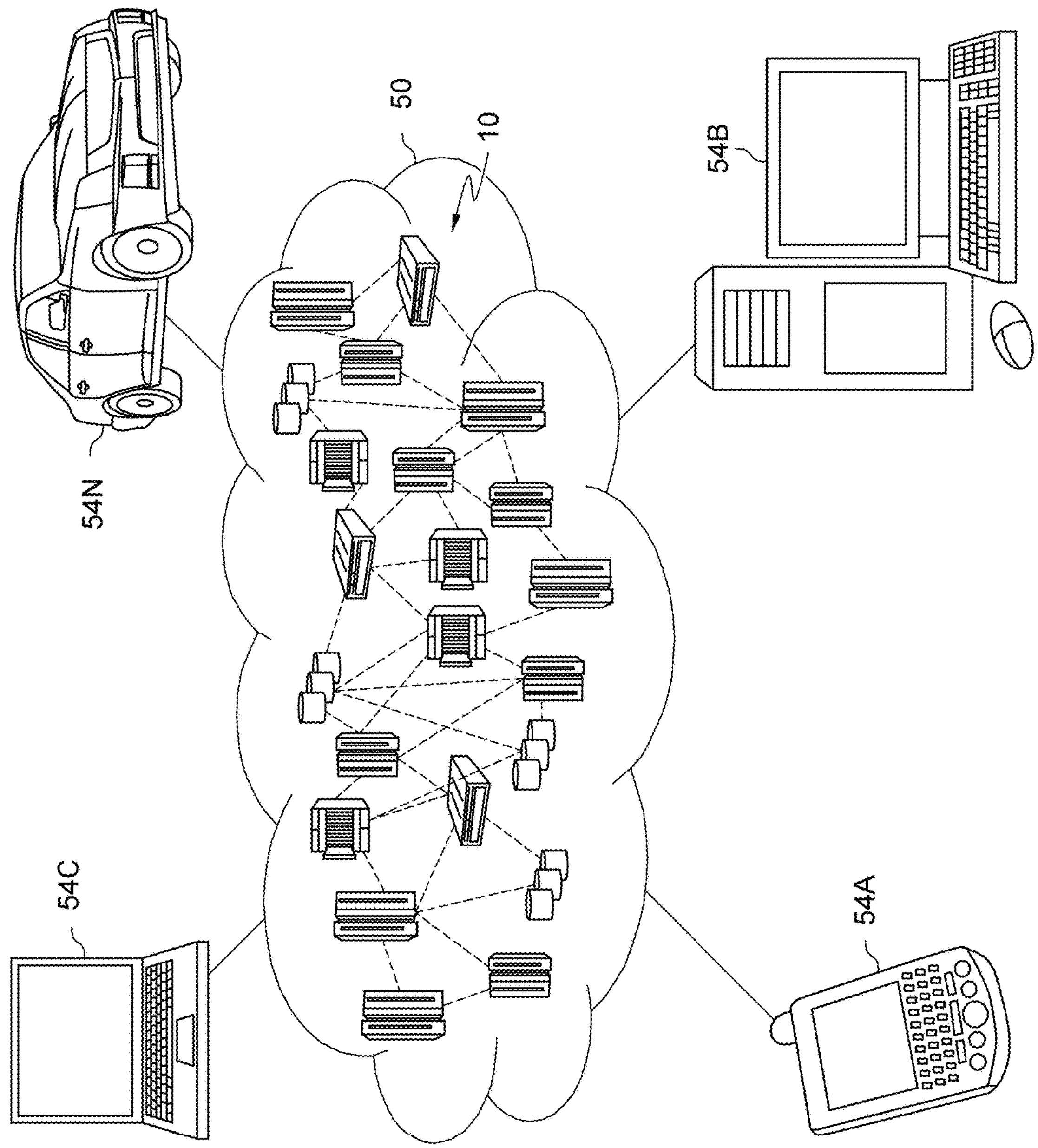
FIG. 8 depicts a cloud computing environment according to some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
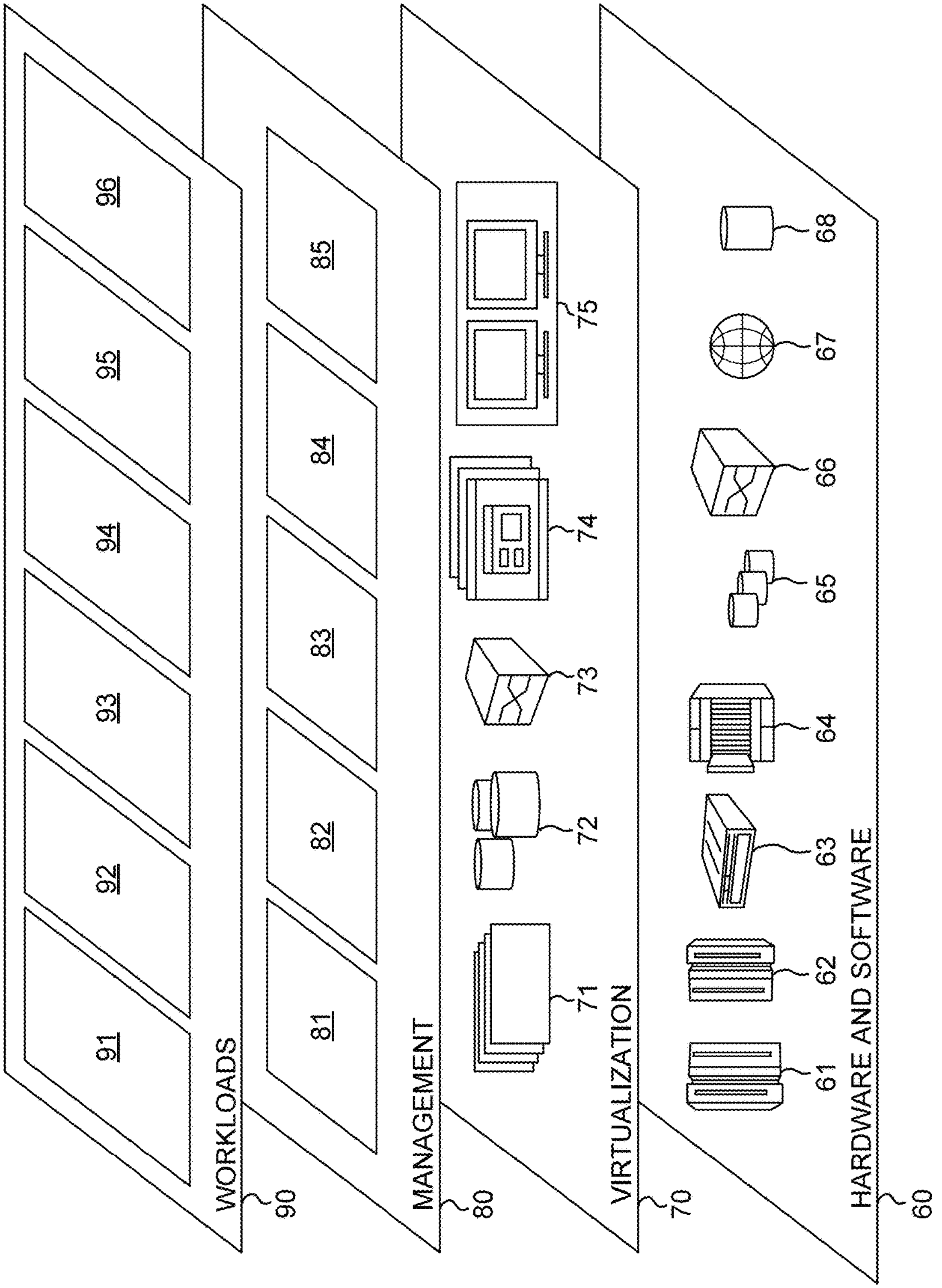
FIG. 9 depicts abstraction model layers according to some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic prediction system 96. Traffic prediction system 96 can perform part or all of method 100 of FIG. 1, can be a workload or function performing one or more tasks associated with cloud 402 of FIG. 4, and/or can be substantially similar to computer system 700 of FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. However, the various embodiments can be practiced without these specific details. In other instances, well-known circuits, structures, and techniques have not been shown in detail in order not to obscure embodiments.

What is claimed is:

1. A method for calculating traffic flow changes, the method comprising:

detecting a traffic event;

determining an affected area of the traffic event;

determining an investigation area based on the affected area;

selecting at least one vehicle located within the investigation area;

calculating a change in traffic flow due to the traffic event based on a comparison of a predicted traffic flow with a current traffic flow, wherein the current traffic flow is based on information received from the at least one vehicle;

updating the affected area based on the change in traffic flow; and calculating an updated change in traffic flow based on the updated affected area when the updated affected area is larger than a predetermined threshold area.

2. The method of claim 1, wherein selecting at least one vehicle further includes predicting a number of road segments on which vehicles located within the investigation area are to travel.

3. The method of claim 1, wherein selecting the at least one vehicle further includes calculating a driving behavior of vehicles located in the investigation area.

4. The method of claim 1, further comprising:

determining a quantity of vehicles located within the investigation area to select.

5. The method of claim 4, wherein determining the quantity of vehicles includes determining at least one of an event type of the traffic event or an event severity of the traffic event.

6. The method of claim 1, further comprising:

requesting data values from the at least one vehicle, wherein the data values include location information of the at least one vehicle.

7. The method of claim 1, wherein updating the affected area further includes predicting a propagation of the traffic event.

8. The method of claim 1, wherein detecting the traffic event includes detecting a plurality of concurrent traffic events.

9. A method for calculating traffic flow changes, the method comprising:

detecting a first traffic event and a second traffic event, wherein the first traffic event and the second traffic event occur contemporaneously;

calculating a first affected area of the first traffic event and a second affected area of the second traffic event;

determining an area of overlap where the first affected area overlaps with the second affected area;

comparing the area of overlap with a threshold area; and when the area of overlap is greater than the threshold area, determining a combined affected area based on the first affected area and the second affected area.

10. The method of claim 9, wherein the threshold area is any amount greater than zero.

11. The method of claim 9, wherein the threshold area includes at least one road segment.

12. The method of claim 9, wherein:

the first affected area has a first shape; and the combined affected area has a second shape that is different than the first shape.

13. The method of claim 9, wherein:

the combined affected area is a circle centered at a centroid calculated from a first center of the first affected area and from a second center of the second affected area.

14. The method of claim 13, wherein:

the circle has a radius that covers all of the first affected area and all of the second affected area.

15. The method of claim 9, further comprising:

determining an investigation area based on the combined affected area;

selecting at least one vehicle located within the investigation area; and calculating a change in traffic flow due to the first and second traffic events based on a comparison of a predicted traffic flow and a current traffic flow, wherein the current traffic flow is based on information received from the at least one vehicle.

16. The method of claim 15, further comprising:

updating the combined affected area based on the change in traffic flow; and calculating an updated change in traffic flow based on the updated combined affected area when the updated combined affected area is larger than an updated threshold area.

17. A system for calculating traffic flow changes, the system comprising:

one or more processors; and a memory communicatively coupled to the one or more processors, wherein the memory comprises instructions which, when executed by the one or more processors, cause the one or more processors to perform a method comprising:

detecting a first traffic event and a second traffic event, wherein the first traffic event and the second traffic event occur contemporaneously;

determining a combined affected area of the first traffic event and the second traffic event;

determining an investigation area based on the combined affected area;

selecting at least one vehicle located within the investigation area;

calculating a change in traffic flow due to the first and second traffic events based on a comparison of a predicted traffic flow and a current traffic flow, wherein the current traffic flow is based on information received from the at least one vehicle;

updating the combined affected area based on the change in traffic flow; and calculating an updated change in traffic flow based on the updated combined affected area when the updated combined affected area is larger than a predetermined threshold area.

18. The system of claim 17, wherein selecting at least one vehicle within the investigation area further includes predicting a number of road segments on which vehicles located within the investigation area are to travel.

19. The system of claim 18, wherein selecting at least one vehicle within the investigation area further includes weighting the road segments on which vehicles located within the investigation area are predicted to travel.

20. The system of claim 17, wherein selecting at least one vehicle within the investigation area further includes calculating a driving behavior of vehicles located in the investigation area.

21. The system of claim 17, wherein:

the method further comprises determining a quantity of vehicles located within the investigation area to select, and determining the quantity includes determining at least one of an event type of the first traffic event, an event type of the second traffic event, an event severity of the first traffic event, or an event severity of the second traffic event.

22. The system of claim 17, wherein:

the method further comprises requesting data values from the at least one vehicle, and the data values include location information of the at least one vehicle.

23. The system of claim 17, wherein updating the combined affected area further includes predicting a propagation of the first and second traffic events.

24. A system for calculating traffic flow changes, the system comprising:

one or more processors; and a memory communicatively coupled to the one or more processors, wherein the memory comprises instructions which, when executed by the one or more processors, cause the one or more processors to perform a method comprising:

detecting a first traffic event and a second traffic event, wherein the first traffic event and the second traffic event occur contemporaneously;

calculating a first affected area of the first traffic event and a second affected area of the second traffic event;

determining an area of overlap where the first affected area overlaps with the second affected area;

comparing the area of overlap with a threshold area; and when the area of overlap is greater than the threshold area, determining a combined affected area based on the first affected area and the second affected area.

25. A computer program product for calculating traffic flow changes, the computer program product comprising a computer readable storage medium having program instructions embodied therewith, the program instructions executable by a computer to perform a method comprising:

detecting a first traffic event and a second traffic event, wherein the first traffic event and the second traffic event occur contemporaneously;

determining a combined affected area of the first traffic event and the second traffic event;

determining an investigation area based on the combined affected area;

selecting at least one vehicle located within the investigation area;

calculating a change in traffic flow due to the first and second traffic events based on a comparison of a predicted traffic flow and a current traffic flow, wherein the current traffic flow is based on information received from the at least one vehicle;

updating the combined affected area based on the change in traffic flow; and calculating an updated change in traffic flow based on the updated combined affected area when the updated combined affected area is larger than a predetermined threshold area.

* * * * *